US012712598B2

(12) United States Patent
Puerta et al.

(10) Patent No.: US 12,712,598 B2
(45) Date of Patent: Aug. 18, 2026

(54) METHOD FOR TRANSMISSION OF DOWNLINK RADIO SIGNALS IN A D-MIMO SYSTEM AND A D-MIMO SYSTEM

(71) Applicant: Telefonaktiebolaget LM Ericsson (PUBL), Stockholm (SE)

(72) Inventors: Rafael Puerta, Sundbyberg (SE); Magnus Nilsson, Lund (SE); Pål Frenger, Linköping (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 272 days.

(21) Appl. No.: 18/709,611

(22) PCT Filed: Nov. 17, 2021

(86) PCT No.: PCT/EP2021/081969
§ 371 (c)(1),
(2) Date: May 13, 2024

(87) PCT Pub. No.: WO2023/088550
PCT Pub. Date: May 25, 2023

(65) Prior Publication Data
US 2025/0007562 A1 Jan. 2, 2025

(51) Int. Cl.
*H04W 4/00* (2018.01)
*H04B 7/024* (2017.01)
*H04L 25/02* (2006.01)

(52) U.S. Cl.
CPC ........... *H04B 7/024* (2013.01); *H04L 25/021* (2013.01)

(58) Field of Classification Search
CPC .... H04B 7/024; H04B 7/0617; H04B 7/0452; H04B 7/0413; H04L 25/021; H04W 88/085
(Continued)

(56) References Cited

U.S. PATENT DOCUMENTS

2018/0167903 A1 6/2018 Fan et al.
2018/0295596 A1* 10/2018 Zhang ................ H04W 64/006
(Continued)

OTHER PUBLICATIONS

3GPP TR 38.801 v14.0.0 (Mar. 2017) 3rd Generation Partnership Project; Technical Specification Group Radio Access Network; Study on new radio access technology; Radio access architecture and interfaces (Release 14).
(Continued)

*Primary Examiner* — Temica M Beamer
(74) *Attorney, Agent, or Firm* — Baker Botts L.L.P.

(57) ABSTRACT

A method for transmission of DownLink, DL, radio signals in a Distributed Multiple Input Multiple Output, D-MIMO, system of a Radio Access Network, RAN. The D-MIMO system comprises a Central Unit, CU, with Digital Signal Processing, DSP, a first remote radio-head and a second remote radio-head, an analogue optical fronthaul link.
The method comprises receiving (500*a*) a respective first and second UL transmission from the wireless communications device via the respective first and second remote radio-head over the analogue optical fronthaul link.
The method further comprises estimating (501*a*) a respective first and second effective UL channel for signals from the wireless communications device via the first and second remote radio-head based on applying DSP to the respective first and second UL transmission.
The method further comprises estimating (503) a respective first and second calibration channel based on applying DSP to a respective first and second reference radio signal transmitted wirelessly between the first remote radio-head and the second remote radio-head.
The method further comprises synchronizing (505) a respective first and second DL radio signal from the respective first and second remote radio-head to the wireless communications device by compensating the second DL transmission
(Continued)

based on the estimated second effective UL channel, and further based on the estimated first and second calibration channels.

20 Claims, 8 Drawing Sheets

(58) Field of Classification Search
USPC .......................................................... 370/329
See application file for complete search history.

(56) References Cited

U.S. PATENT DOCUMENTS

2020/0052757 A1* 2/2020 Wang .................... H04W 24/02
2020/0328829 A1* 10/2020 Papadopoulos ........ H04B 17/14
2021/0266070 A1 8/2021 Yang et al.

OTHER PUBLICATIONS

Chia-Yi Wu et al. "Distributed Multi-User MIMO Transmission Using Real-Time Sigma-Delta-Over-Fiber for Next Generation Fronthaul Interface", Journal of Lightwave Technology, vol. 38, No. 4, Feb. 15, 2020.
Zbigniew Zakrzewski "D-RoF and A-RoF Interfaces in an All-Optical Fronthaul of 5G Mobile Systems" Applied Sciences—Published: Feb. 11, 2020.
ETSI TS 138 211 v16.5.0 (Apr. 2021) 5G; NR; Physical channels and modulation (3GPP TS 38.211 version 16.5.0 Release 16).
ETSI TS 138 214 v16.4.0 (Jan. 2021); 5G; NR; Physical layer procedures for data (3GPP TS 38.214 version 16.4.0 Release 16).
PCT Notification of Transmittaion of the International Search Report and the Written Opinion of the International Searching Authority, or the Declaration issued for International application No. PCT/EP2021/081969—Aug. 26, 2022.
Elina Nayebi et al. "Precoding and Power Optimization in Cell-Free Massive MIMO Systems" IEEE Transactions on Wireless Communications, vol. 16, No. 7—Jul. 2017.
Isiaka Ajewale Alimi et al. "Toward an Efficient C-RAN Optical Fronthaul for the Future Networks: A Tutorial on Technologies, Requirements, Challenges, and Solutions" IEEE Communications Surveys & Tutorials, vol. 20, No. 1, First Quarter 2018.
Giovanni Interdonato et al. "Ubiquitous cell-free Massive MIMO communications" EURASIP Journal on Wireless Communications and Networking—2019.

* cited by examiner

METHOD FOR TRANSMISSION OF DOWNLINK RADIO SIGNALS IN A D-MIMO SYSTEM AND A D-MIMO SYSTEM

PRIORITY

This nonprovisional application is a U.S. National Stage Filing under 35 U.S.C. § 371 of International Patent Application Serial No. PCT/EP2021/081969 filed Nov. 17, 2021 and entitled "A METHOD FOR TRANSMISSION OF DOWNLINK RADIO SIGNALS IN A D-MIMO SYSTEM AND A D-MIMO SYSTEM" which is hereby incorporated by reference in its entirety.

TECHNICAL FIELD

The embodiments herein relate to a Distributed Multiple Input Multiple Output (D-MIMO) system, and methods for transmission of Downlink radio signals in the D-MIMO system.

Specifically, embodiments herein relate to methods for coherent joint transmission. A corresponding computer program and a computer program carrier are also disclosed.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio access node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to evolve the specifications of the Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

To increase the capacity of wireless communication systems, it may be preferred to be as close as possible to a wireless communications device in an unobstructed environment. To achieve this, a network topology that is distributed in space may be needed.

A Distributed Multiple-Input Multiple-Output (D-MIMO) communications system is a system where a base station's antennas are distributed over a cell in contrast to traditional deployments where the antennas are co-located in a single array in a cell center. From a performance standpoint, D-MIMO typically performs better than traditional co-located massive MIMO.

D-MIMO systems should be highly scalable and flexible to be able to provide true ubiquitous connectivity. This applies specifically at high frequencies, e.g., the 5G New Radio Frequency Range 2 (FR2), i.e., 24.25 GHz to 52.6 GHz and above. This is mainly due to the higher propagation losses and the corresponding shrinking form factors of the antennas at these frequencies. Also, higher frequencies are also more sensitive to radio blocking compared to lower frequency bands.

The probability of achieving a Line-of-Sight (LoS) channel between a wireless communications device, such as a User Equipment (UE), and one network Access Point (AP) is significantly larger for a D-MIMO system than for a centralized MIMO system. This makes D-MIMO a promising technique for building wireless communications systems with high performance and reliable coverage.

Non-coherent and Coherent Joint Transmission from D-MIMO system Joint transmission schemes are used for the simultaneous transmission from multiple access points to the same UE. One of the schemes used in coordinated multi-point (CoMP) technology is joint processing including joint transmission (JT) and reception. JT may include two approaches: non-coherent (NCJT) and coherent joint transmission (CJT).

In NCJT, the network does not use detailed channel information in the joint transmission and in the majority of cases no radio frequency (RF) phase coherency is achieved. Therefore, a main gain that may be eventually achieved by NCJT is that the power of several APs is used to serve the same UE, i.e., a power gain. The use of distributed APs may still provide a significant macro diversity gain also when NCJT is used.

Conversely, in CJT, the detailed channel information between the UE and two or more APs involved in the JT is used to calculate the transmission precoding weights of all APs. In principle, by means of CJT the greatest MIMO gains can be realized, i.e., diversity and power gains. On the other hand, CJT requires stringent requirements on the time synchronization and relative phase coherency of the cooperating APs which may increase the complexity of its implementation. It is noted that in communication systems where channel reciprocity holds (e.g., TDD), calibration and precoding schemes to achieve CJT may be relaxed.

Optical Interfaces of D-MIMO Systems

A centralized Radio Access Network (C-RAN) architecture, also referred to as cloud RAN architecture, is an appealing way of implementing D-MIMO since most of the digital signal processing (DSP) is centralized in a Central Unit (CU) with sufficient resources, while the complexity of the APs may be reduced. However, most of the current C-RAN solutions use digital optical interfaces for the FrontHaul (FH) links, e.g., Common Public Radio Interface (CPRI), enhanced CPRI (eCPRI) or Open Base-Station Architecture Initiative (OBSAI) interfaces. Consequently, in the APs a digital interface termination and all the DSP of a digital front-end (DFE) is needed.

Conventional digital FH interfaces, e.g., CPRI and eCPRI, used in today's D-MMO systems may not be practical for CJT since it is difficult to measure the delay of the corresponding digital FH links without relying on additional techniques, e.g., Global Navigation Satellite System (GNSS). However, measuring the delay with GNSS may lead to excessive overhead between the APs and/or the CU and extensive DSP in each AP to achieve the desired synchronization.

Furthermore, current digital FH interfaces fall short to meet the forecasted requirements of beyond 5G (B5G) and 6G D-MIMO systems. Some main issues and challenges are:

The CPRI/eCPRI fronthaul FH bottleneck due to the low spectral efficiency (SE) of these interfaces, e.g., low SE of digitized RF signals (I and Q components).

The CPRI/eCPRI data rate scales with the bandwidth of the system and, depending on the functional split, scales with the number of MIMO layers or the number of antenna ports.

The high-power consumption of the D-MIMO system due to the complexity of digital transceivers and digital interfaces routing hardware (HW) in each AP, e.g., CPRI/eCPRI switch in each AP.

Projected B5G/6G extreme bandwidth and capacity requirements, e.g., BW>1 GHz and data rates>100 Gbps.

A data rate scaling problem may be exemplified with the data rate of CPRI-like interfaces dependency on the system bandwidth and number of antenna ports (distributed or co-located) according to the below table.

| Number of | Frequency System Bandwidth | | |
|---|---|---|---|
| Antenna Ports | 20 MHz | 200 MHz | 1 GHz |
| 2 | 2 Gbps | 20 Gbps | 100 Gbps |
| 8 | 8 Gbps | 80 Gbps | 400 Gbps |
| 64 | 64 Gbps | 640 Gbps | 3200 Gbps |
| 256 | 256 Gbps | 2560 Gbps | 12800 Gbps |

The complexity, the power consumption and the size of such APs reduce the scalability capabilities of such RANs. Thus, there is still room for reducing the complexity, the power consumption and the size of the APs and therefore increasing the scalability capabilities of C-RANs using D-MIMO.

SUMMARY

An alternative to using digital optical interfaces for the FH links is analogue optical interfaces.

Analogue optical links technology does not rely on bits to transmit data since an optical carrier that propagates, e.g., through a fibre, is modulated with the same waveforms as the signals to be transmitted wirelessly, e.g., analogue radio-over-fibre (ARoF) signals. Thus, a baseband signal and a signal transmitted through the fibre are the same which eliminates the data rate scaling problem of CPRI-like interfaces. Consequently, analogue fronthaul links may allow to reduce power consumption and facilitate C-RAN enabling small form-factor APs, D-MIMO digital beamforming techniques, e.g., coherent joint transmission, and wideband signal transmissions, e.g., >1 GHz. The latter is possible since the limited capacity of digital interfaces and the limited processing capabilities of conventional DFEs are not an issue anymore. For example, the DFE transmitter synthesis bandwidth (BW) typically is limited to a few hundreds of MHz.

As mentioned above, it is beneficial if the fronthaul links of D-MIMO systems are perfectly synchronized, but this is complex to fulfill and typically requires additional timing references and schemes, e.g., GNSS.

Further, analogue FH links are usually considered ideal and no detailed methods are provided on how to synchronize the remote radio heads (RRHs) or APs of a D-MIMO network to achieve a very high degree of phase alignment needed for CJT.

Thus, if the different APs of the D-MIMO system are not synchronized and their transmissions are not phase aligned, it is often the case that only non-coherent joint transmissions are possible. Consequently, current D-MIMO systems may not fully take advantage of the benefits of diversity and power gains of MIMO systems. This also applies for analogue optical links and their corresponding interfaces. In addition, current technical specifications, e.g., 3GPP TS 38.214 Physical layer procedures for data Release 16 Section 5.2.2.2, only support NCJT, for either co-located MIMO (single-panel) or D-MIMO (multi-panel).

One alternative to achieve CJT in a D-MIMO system is to perform the channel estimation and determine precoding/combining schemes in each RRH and to share this information between all RRHs which will allow the RRHs to synchronize. The downside of this approach is that each RRH is required to perform substantial digital signal processing (DSP) which will increase the complexity and power consumption of the system. Additionally, the APs digital interface modules increase the power consumption even further.

Since the optical carrier of the analogue optical FH link is modulated with the same waveforms as the signals to be transmitted wirelessly it is possible to estimate the amplitude and phase changes (e.g., delays) due to the analogue optical FH links by proper calibration of the D-MIMO system.

However, it is not obvious how to calibrate and compensate a D-MIMO or cell-free MIMO system where the APs are not co-located and the distance between them is not constant while avoiding using GNSS based synchronization schemes and/or complex DSP in each AP.

Given the unique properties of the analogue optical FH links, the solutions used for D-MMO systems comprising conventional FH with digital links cannot be directly applied to the analogue solutions. Therefore, a new cost-efficient solution is needed to synchronize and calibrate the APs in a D-MIMO system with FH optical interfaces.

An object of embodiments herein may therefore be to obviate some of the problems mentioned above related to D-MIMO systems, in particular D-MIMO systems with an optical fronthaul link.

According to a first aspect, the object is achieved by a method for transmission of DownLink, DL, radio signals in a Distributed Multiple Input Multiple Output, D-MIMO, system of a Radio Access Network, RAN. The D-MIMO system comprises a Central Unit, CU, with Digital Signal Processing, DSP, e.g., for processing UpLink, UL, radio signals for channel estimation and/or for synchronizing the DL radio signals. The D-MIMO system further comprises a first remote radio-head and a second remote radio-head for wireless communication with a wireless communications device. The D-MIMO system further comprises an analogue optical fronthaul link between the CU and the respective remote radio-head for transmitting and receiving the DL and UL radio signals between the CU and the respective remote radio-head.

The method comprises receiving, by the CU, a first uplink, UL, transmission from the wireless communications device via the first remote radio-head over the analogue optical fronthaul link.

The method further comprises receiving, by the CU, a second uplink, UL, transmission from the wireless communications device via the second remote radio-head over the analogue optical fronthaul link.

The method further comprises estimating, by the CU, a first effective UL channel for signals from the wireless communications device via the first remote radio-head based on applying DSP to the first UL transmission, wherein the first effective UL channel includes: a wireless UL channel between the wireless communications device and the first remote radio-head, at least one optical component of a first UL part of the analogue optical fronthaul link between the first remote radio-head and the CU, at least one component of a receiver chain of the first remote radio-head and at least one component of a transmitter chain of the wireless communications device.

The method further comprises estimating, by the CU, a second effective UL channel for signals from the wireless communications device to the second remote radio-head based on applying DSP to the second UL transmission, wherein the second effective UL channel includes: a wireless UL channel between the wireless communications device and the second remote radio-head, at least one optical component of a second UL part of the analogue optical fronthaul link between the second remote radio-head and the CU, at least one component of a receiver chain of the second remote radio-head and at least one component of the transmitter chain of the wireless communications device.

The method further comprises estimating, by the CU, a first calibration channel based on applying DSP to a first reference radio signal transmitted wirelessly from the first remote radio-head and received wirelessly at the second remote radio-head.

The method further comprises estimating, by the CU, a second calibration channel based on applying DSP to a second reference radio signal transmitted wirelessly from the second remote radio-head and received wirelessly at the first remote radio-head.

The method further comprises synchronizing, by the CU, a first DL transmission of a first DL radio signal from the first remote radio-head to the wireless communications device with a second DL transmission of a second DL radio signal from the second remote radio-head to the wireless communications device such that at the wireless communications device a respective phase of the received first and second radio signals is phase aligned with each other, wherein synchronizing is performed by:

a) compensating, by the CU, the first DL transmission of the first DL radio signal from the first remote radio-head based on the estimated first effective UL channel; and b) compensating, by the CU, the second DL transmission of the second DL radio signal from the second remote radio-head based on the estimated second effective UL channel, and further based on the estimated first calibration channel and the estimated second calibration channel.

The method further comprises transmitting, by the CU, the first DL radio signal to the first remote radio-head and the second DL radio signal to the second remote radio-head over the analogue optical fronthaul link.

According to a second aspect, the object is achieved by a Distributed Multiple Input Multiple Output, D-MIMO, system of a Radio Access Network, RAN. The D-MIMO system comprises a Central Unit, CU, with Digital Signal Processing, DSP, e.g., for processing UpLink, UL, radio signals for channel estimation and/or for synchronizing DownLink, DL, radio signals. The D-MIMO system further comprises a first remote radio-head and a second remote radio-head for wireless communication with a wireless communications device. The D-MIMO system further comprises an analogue optical fronthaul link between the CU and the respective remote radio-head for transmitting and receiving analogue radio signals between the CU and the respective remote radio-head.

The CU is configured to receive a first UL transmission from the wireless communications device via the first and the second remote radio-head over the analogue optical fronthaul link.

The CU is further configured to receive a second UL transmission from the wireless communications device via the second remote radio-head over the analogue optical fronthaul link.

The CU is further configured to estimate a first effective UL channel for signals from the wireless communications device via the first remote radio-head based on applying DSP to the first UL transmission. The first effective UL channel includes: a wireless UL channel between the wireless communications device and the first remote radio-head, at least one optical component of a first UL part of the analogue optical fronthaul link between the first remote radio-head and the CU, at least one component of a receiver chain of the first remote radio-head and at least one component of a transmitter chain of the wireless communications device.

The CU is further configured to estimate a second effective UL channel for signals from the wireless communications device to the second remote radio-head based on applying DSP to the second UL transmission. The second effective UL channel includes: a wireless UL channel between the wireless communications device and the second remote radio-head, at least one optical component of a second UL part of the analogue optical fronthaul link between the second remote radio-head and the CU, at least one component of a receiver chain of the second remote radio-head and at least one component of the transmitter chain of the wireless communications device.

The CU is further configured to estimate a first calibration channel based on applying DSP to a first reference radio signal transmitted wirelessly from the first remote radio-head and received wirelessly at the second remote radio-head.

The CU is further configured to estimate a second calibration channel based on applying DSP to a second reference radio signal transmitted wirelessly from the second remote radio-head and received wirelessly at the first remote radio-head.

The CU is further configured to synchronize a first DL transmission of a first DL signal from the first remote radio-head to the wireless communications device with a second DL transmission of a second DL signal from the second remote radio-head to the wireless communications device such that at the wireless communications device a respective phase of the received first and second radio signals is phase aligned with each other. The CU is configured to synchronize the first DL transmission with the second DL transmission by being configured to:

a) compensate the first DL transmission of the first radio signal from the first remote radio-head to the wireless communications device based on the estimated first effective UL channel; and b) compensate the second DL transmission of the second DL radio signal from the second remote radio-head to the wireless communications device based on the estimated second effective UL channel, and further based on the estimated first calibration channel and the estimated second calibration channel.

The CU is further configured to transmit the first DL radio signal to the first remote radio-head and the second DL radio signal to the second remote radio-head over the analogue optical fronthaul link.

According to a further aspect, the object is achieved by a computer program comprising instructions, which when executed by a D-MIMO system causes the D-MIMO system to perform actions according to the first aspect above. Specifically, the computer program may comprise instructions, which when executed by the CU causes the CU to perform actions according to the first aspect above.

According to a further aspect, the object is achieved by a carrier comprising the computer program of the further aspect above, wherein the carrier is one of an electronic signal, an optical signal, a radio signal and a computer readable medium. The signal may further be an electromagnetic signal, a magnetic signal, an electric signal, and a microwave signal.

The centralised D-MIMO system comprises the analogue optical fronthaul link which present certain advantages over a digital fronthaul link. However, synchronisation of DL signals is not straightforward with the analogue optical fronthaul link.

Since the CU of the D-MIMO system compensates the first DL transmission of the first DL radio signal from the first remote radio-head based on the estimated first effective UL channel and compensates the second DL transmission of the second DL radio signal from the second remote radio-head based on the estimated second effective UL channel, and further based on the estimated first calibration channel and the estimated second calibration channel, the D-MIMO system is able to synchronize the DL transmissions from the D-MIMO system using the analogue optical fronthaul link such that at the wireless communications device the respective phase of the received first and second radio signals is phase aligned with each other. For example, the D-MIMO system is able to compensate for amplitude and phase variations in the FH link, front-ends of the remote radio-heads, wireless channel and front-ends of the wireless communications device.

Thus, a calibration scheme according to embodiments herein enables D-MIMO CJT which improves the performance compared to conventional D-MIMO NCJT schemes.

A further advantage of embodiments herein is that they are compatible with the technical specifications in TS 38.214 Sections 5 and 6 which may be used with D-MIMO networks where the APs and its antenna elements are not co-located. This means that embodiments herein are compatible with conventional reference signals, e.g., Sounding Reference Signals (SRS), and its associated channel estimation schemes in TDD systems.

Embodiments herein also provide a power efficient D-MIMO implementation. Compared to solutions with conventional low-layer splits (LLS) where each AP includes numerous digital functions, e.g., Fast Fourier Transform (FFT) and Inverse FFT (IFFT) modules, Digital-to-Analogue converters (DAC) and Analogue-to-Digital Converters (ADC), digital precoding, the APs in embodiments herein include front-ends without these digital functions which reduces considerably the overall power consumption and complexity of the APs.

Further, in conventional solutions, where each AP has its own digital transceiver, the baseband BW that each AP is able to process is limited to a few hundreds of MHz under reasonable power-consumption values per AP. In embodiments herein, since all digital signal processing (DSP) is centralized in the CU with sufficient processing resources, e.g., giga-sample DAC/ADCs, the baseband BW that each AP is able to handle may reach several GHz.

BRIEF DESCRIPTION OF THE DRAWINGS

In the figures, features that appear in some embodiments are indicated by dashed lines.

The various aspects of embodiments disclosed herein, including particular features and advantages thereof, will be readily understood from the following detailed description and the accompanying drawings, in which.

DETAILED DESCRIPTION

As mentioned above, an object of embodiments herein is to provide a practical and cost-effective implementation of a D-MIMO system. In particular, to provide a practical and cost-effective implementation of a D-MIMO system capable of achieving CJT.

Such a D-MIMO system may be realized with analogue optical fronthaul links if proper calibration is done. Thus, analogue optical FH links may be a prospective solution for the fronthaul of next generation mobile systems.

Embodiments herein disclose a joint calibration scheme to synchronize two or more RRHs to achieve CJT in D-MIMO systems. A channel estimation of analogue fronthaul optical links, front-ends of the RRHs, and the radio access links (i.e., wireless links) is performed in one calibration. Thus, embodiments herein may calibrate transmissions of radio signals for the changes invoked by components of the D-MIMO system in one calibration.

More specifically, embodiments herein disclose a reciprocity-based calibration of a D-MIMO system with analogue fronthaul optical links enabling low-power consumption distributed RRHs.

By combining analogue fronthaul optical links with the calibration scheme described in this invention disclosure, the performance of D-MIMO systems is enhanced since CJTs are enabled, taking advantage of the diversity and power gains of MIMO systems.

To realize a power efficient D-MIMO system, embodiments herein disclose a C-RAN architecture using analogue fronthaul optical links to connect the network RRHs.

In a general D-MIMO embodiment where the RRHs are separated by different distances a centralized calibration scheme may be realized by analogue links which removes the DSPs needed in each RRH to perform channel estimation and precoding/combining schemes.

Since the DSP of all RRHs is centralized in a CU with sufficient resources, the embodiments herein allow each RRH to transmit and receive signals with baseband bandwidths of several GHz and to handle RF carriers over the microwave and millimeter bands range, while keeping the RRH power consumption and complexity low.

Thus, embodiments herein are directed towards methods for transmitting DL radio signals in a flexible and cost-effective D-MIMO system such that CJT is achieved. A corresponding D-MIMO system is also disclosed. Although embodiments herein will now be exemplified by describing the method as applied to a fibre-optic FH link, the disclosed embodiments are also applicable to free-space FH links.

Figure 1:
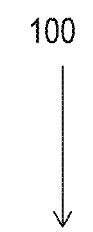
FIG. 1 illustrates exemplifying embodiments of a D-MIMO system.
Figure 1:
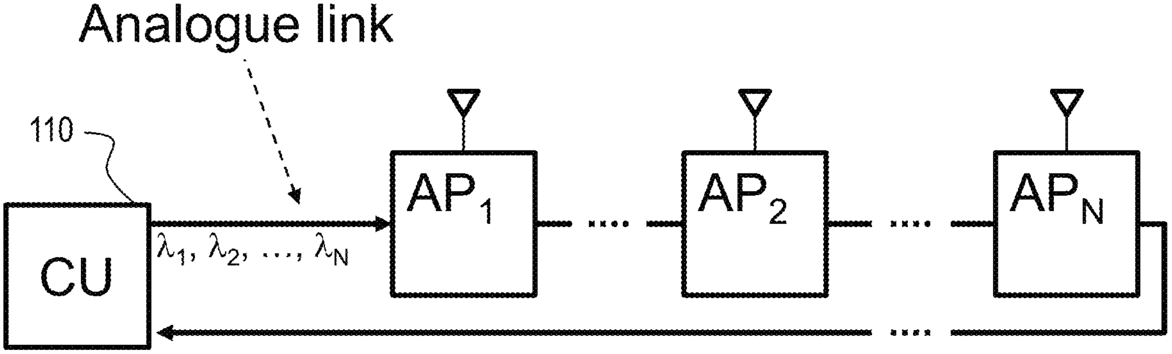

FIG. 1 illustrates an example of a centralized D-MIMO system 100. FIG. 1 is a block diagram where single-antenna remote radio heads $AP_1, AP_2, \ldots AP_N$ are connected to a CU 110 in a ring topology using fronthaul optical links. The optical links may for example be fibre-optic links or free-space links.

By means of dense wavelength division multiplexing (DWDM), transmitted optical signals from the CU 110 to all RRHs may be sent using a different optical carrier frequency, i.e. a different carrier wavelength ($\lambda_1, \lambda_2, \ldots, \lambda_N$). It is noted that more than one wavelength may be assigned to an AP, e.g., in case it has more than one antenna.

Figure 2A:
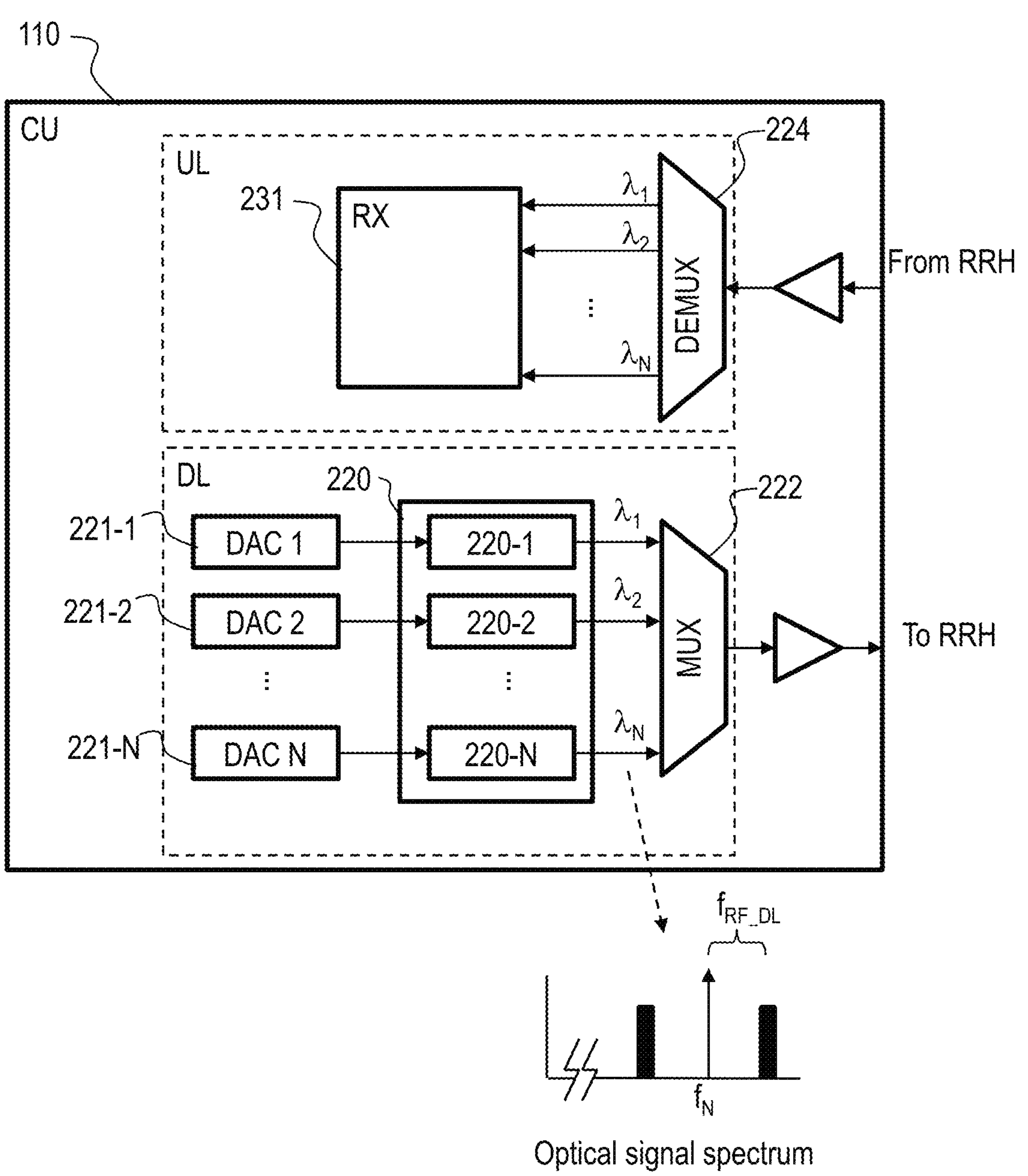
FIG. 2*a* illustrates exemplifying embodiments of a central unit.
Figure 2B:
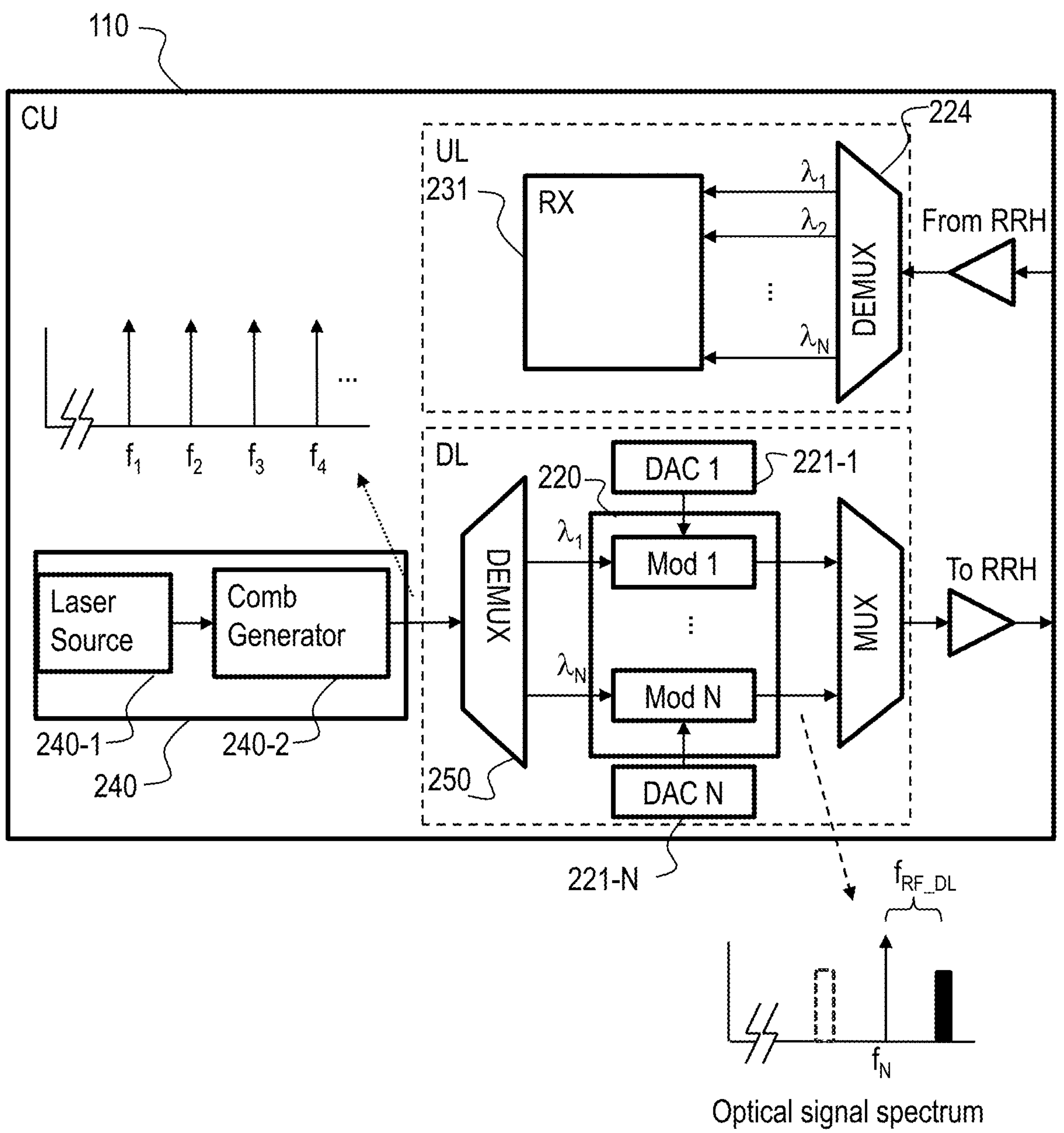
FIG. 2*b* illustrates further exemplifying embodiments of a central unit.

FIG. 2*a* and FIG. 2*b* each illustrate a respective block diagram of two exemplary embodiments of the CU 110.

The CU 110 may comprise an optical transmitter 220, e.g., a Directly Modulated Laser (DML) or an optical modulator, to transmit DL signals.

FIG. 2*a* and FIG. 2*b* each illustrate the CU 110 when a DL Analogue Radio-over-Fibre (ARoF) signal is below the bandwidth (BW) of the optical transmitter 220 comprised in the CU 110.

As mentioned, the analogue DL ARoF signal to be transmitted may be a Radio-Frequency-over-Fibre (RFoF) signals or an Intermediate Frequency (IF)-over-fibre signal. When RFoF is used a data-carrying RF signal with the actual wireless carrier frequency (e.g., greater than 10 GHz) is imposed on a lightwave signal before being transported over the optical FH link. In an IFoF architecture, an IF radio signal with a lower frequency than the wireless carrier frequency (e.g., less than 10 GHz) is used for modulating light before being transported over the optical link. Therefore, before radiating through the air, the signal may be up-converted to RF frequencies at the remote radio head.

FIG. 2*a* illustrates embodiments wherein the optical transmitter 220 comprises one or more DMLs 220-1, 220-2, . . . 220-N.

FIG. 2*b* illustrates embodiments wherein the optical transmitter 220 comprises one or more external optical modulators Mod 1, . . . , Mod N.

For both the embodiment of FIG. 2*a* and the embodiment of FIG. 2*b* the CU 110 may comprise one or more DACs 221-1, . . . 221-N that each convert a digital radio signal to an analogue radio signal.

In the embodiment depicted in FIG. 2*a*, each optical wavelength ($\lambda_\kappa$) transmitted to each RRH is generated by a respective DML. The optical carrier frequency of each DML, e.g., $f_N$ of the Nth DML 220-N, is selected to coincide with the channels of an optical multiplexer (MUX) 222 and a demultiplexer (DEMUX) 224 used. Due to the nature of DMLs, the resulting optical modulation is double sideband (DSB) modulation. The frequency separation between the optical carrier and the radio baseband signal is $f_{RF\_DL}$. Therefore, to enable optical heterodyne detection for RF upconversion in the RRHs, the DMLs carrier frequencies and the channel frequency spacing of the MUX/DEMUXs 222, 224 are chosen accordingly so the optical carrier and at least one of the sidebands of the ARoF signal for each RRH are multiplexed before the transmission to all RRHs.

In the realization in FIG. 2*b*, a light source 240 is used to generate an optical comb from which the optical wavelengths ($\lambda_\kappa$) transmitted to all RRHs are derived. The light source 240 may be a single light source. The light source 240 may comprise a laser 240-1. The laser 240-1 may be a single wavelength laser. The light source 240 may further comprise a comb generator 240-2.

The different wavelengths of the optical comb are demultiplexed using a second DEMUX 250. Each demultiplexed optical carrier is modulated to generate an ARoF signal to enable optical heterodyne detection in each remote radio heads $AP_1, AP_2, \ldots AP_N$. If modulation of the optical carrier is done using an intensity modulator, resulting modulation is double-side band (DSB), and if modulation is done using an I/Q modulator, single sideband (SSB) modulation can be achieved.

After modulation, the ARoF signals to be transmitted to all RRHs may be multiplexed with a MUX. The frequency separation between the optical carriers of the optical comb and the channel frequency spacing of the MUX/DEMUXs are selected accordingly so the optical carrier and at least one of the sidebands of the ARoF signal for each RRH are multiplexed before the transmission to all RRHs.

For both embodiments, in uplink (UL) the same number of transmitted wavelengths are received. The incoming UL ARoF signals are first demultiplexed using the DEMUX 224 and subsequently are sent to an optical receiver 231 for further processing, e.g., optical-to-electrical (OE) conversion, demodulation.

Figure 2C:
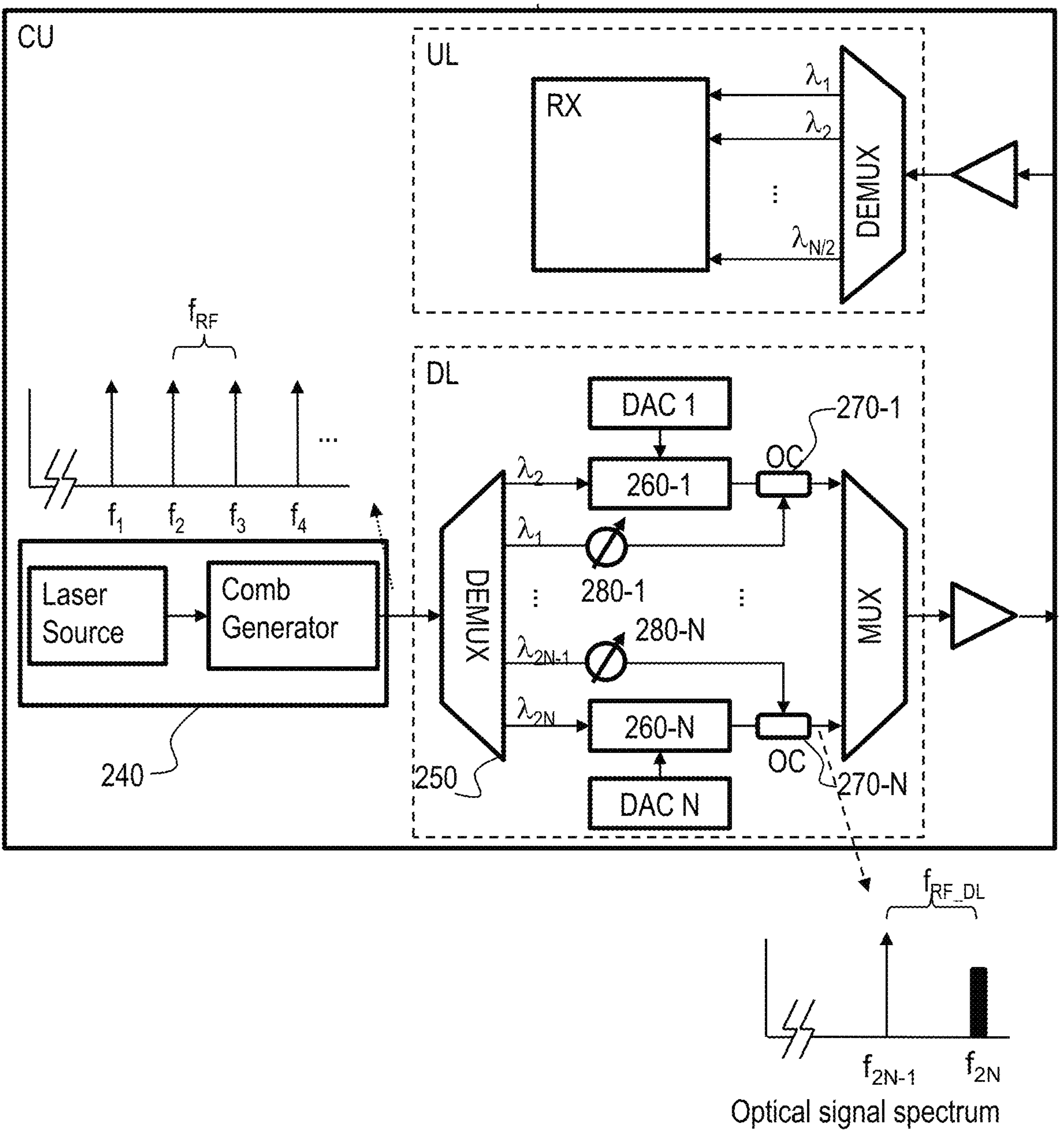
FIG. 2*c* illustrates further exemplifying embodiments of a central unit.

FIG. 2*c* depicts a block diagram of an embodiment of the CU 110 when the ARoF signal for each RRH is generated using two optical carriers, e.g., when the RF carrier frequency is higher than the BW of DMLs and the optical modulators.

As for FIG. 2*b* the single light source 240 is used to generate an optical comb from which the optical wavelengths ($\lambda_\kappa$) transmitted to all RRHs are derived. The different wavelengths of the optical comb are demultiplexed using the second DEMUX 250 with a channel spacing $f_{2N}$-$f_{2N-1}$ equal to the RF carrier frequency $f_{RF\_DL}$, and groups of pairs of wavelengths are used to generate the DL ARoF signal for each DU.

From each pair, one of the optical carriers is modulated using an I/Q modulator 260-1, . . . 260-N with the corresponding baseband signal for each RRH and then it is coupled with the other optical carrier using an optical coupler (OC) 270-1, . . . 270-N. In addition, by means of a variable optical attenuator (VOA) 280-1, . . . 280-N, the carrier-to-signal power ratio (CSPR) may be adjusted to improve the signal quality after heterodyne detection in the RRHs. As for FIG. 2*b*, the CU 110 may comprise one or more DACs that each convert a digital radio signal to an analogue radio signal.

Subsequently, all the DL ARoF signals are multiplexed using a MUX with a channel spacing equal to at least twice the RF carrier frequency, thus both the unmodulated and modulated optical carriers can be placed in a single channel of the MUX. Then, all SSB ARoF signals are transmitted to the RRHs. The frequency separation between the optical carriers of the optical comb and the channel frequency spacing of the MUX/DEMUXs are chosen accordingly so the optical carrier and the sideband of the ARoF signal for each RRH are multiplexed before the transmission to all RRHs.

In UL, the number of received wavelengths is half compared to DL, since in the RRHs only one optical carrier is needed to generate the UL ARoF signals. The incoming UL ARoF signals are first demultiplexed using a DEMUX and subsequently are sent to the receiver for further processing, e.g., OE conversion, demodulation.

Figure 3:
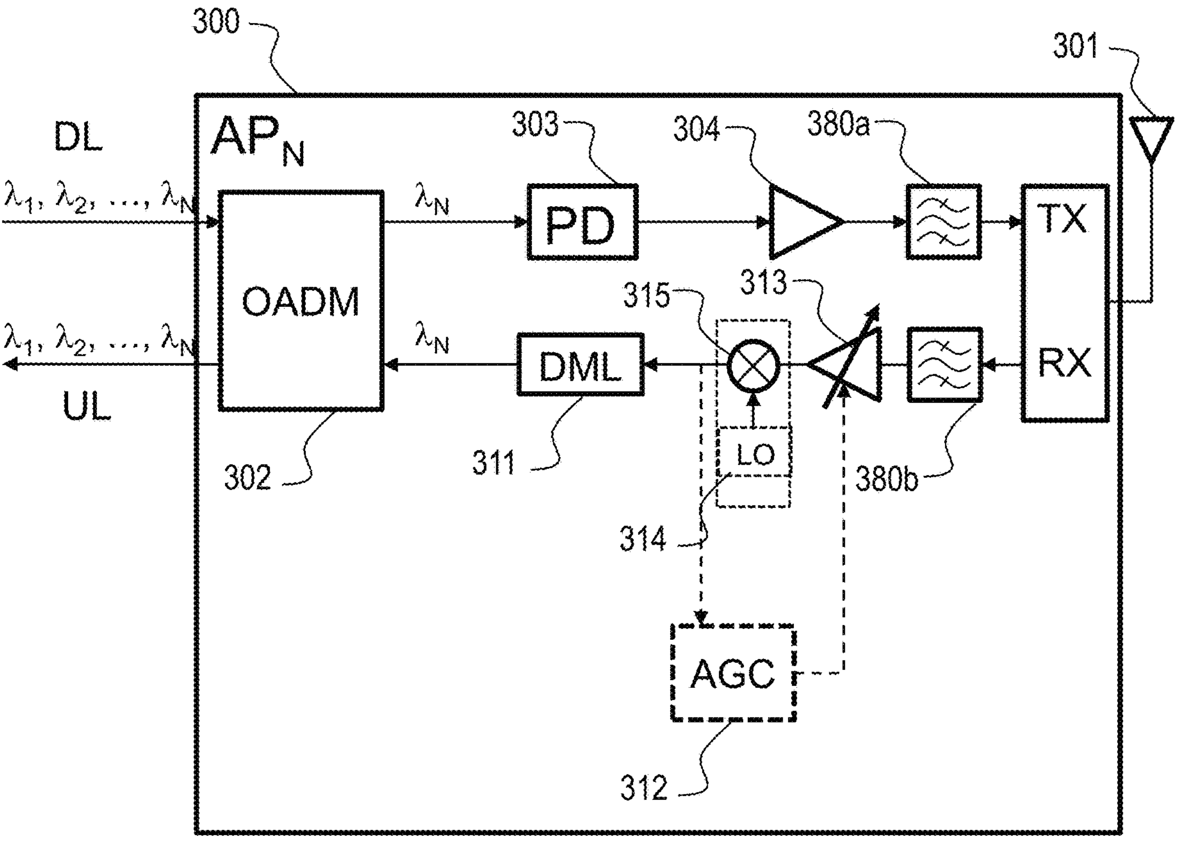
FIG. 3 illustrates exemplifying embodiments of a remote radio-head.

FIG. 3 shows an exemplary embodiment of an RRH 300 with a single antenna 301 and no DSP. The optical DL signal of the RRH with carrier wavelengths $\lambda_1, \lambda_2, \ldots, \lambda_N$, coming from the optical fibre, is first demultiplexed by means of an optical add-drop multiplexer (OADM) 302 and then is sent to a photodetector (PD) 303 for optical-to-electrical (OE) conversion to generate the DL RF signal by means of optical heterodyne detection in the PD. The DL RF signal may be amplified in an electrical amplifier 304, such as a high-power amplifier.

The RF UL received signal drives an optical transmitter 311, such as a DML or a transmitter with an external modulator, for electrical-to-optical (EO) conversion to generate the optical UL signal. Subsequently, this optical signal is multiplexed to the optical fibre by means of the OADM 302. Before EO conversion, an analogue automatic gain control (AGC) module 312 together with a variable amplifier 313 may be used to change the gain to increase the UL dynamic range if necessary. Additionally, the BW of DMLs or external modulators used for analogue FH links typically have a 3-dB BW below 40 GHz. Thus, if the received UL carrier frequency is higher than the 3-dB BW of the optical transmitter, a local oscillator (LO) 314 in combination with one or more frequency multipliers 315 may be used to down-convert the received RF UL signal to an intermediate frequency (IF). The RRH 301 may further comprise RF front-ends, for example comprising RF transmitters and receivers.

Figure 4:
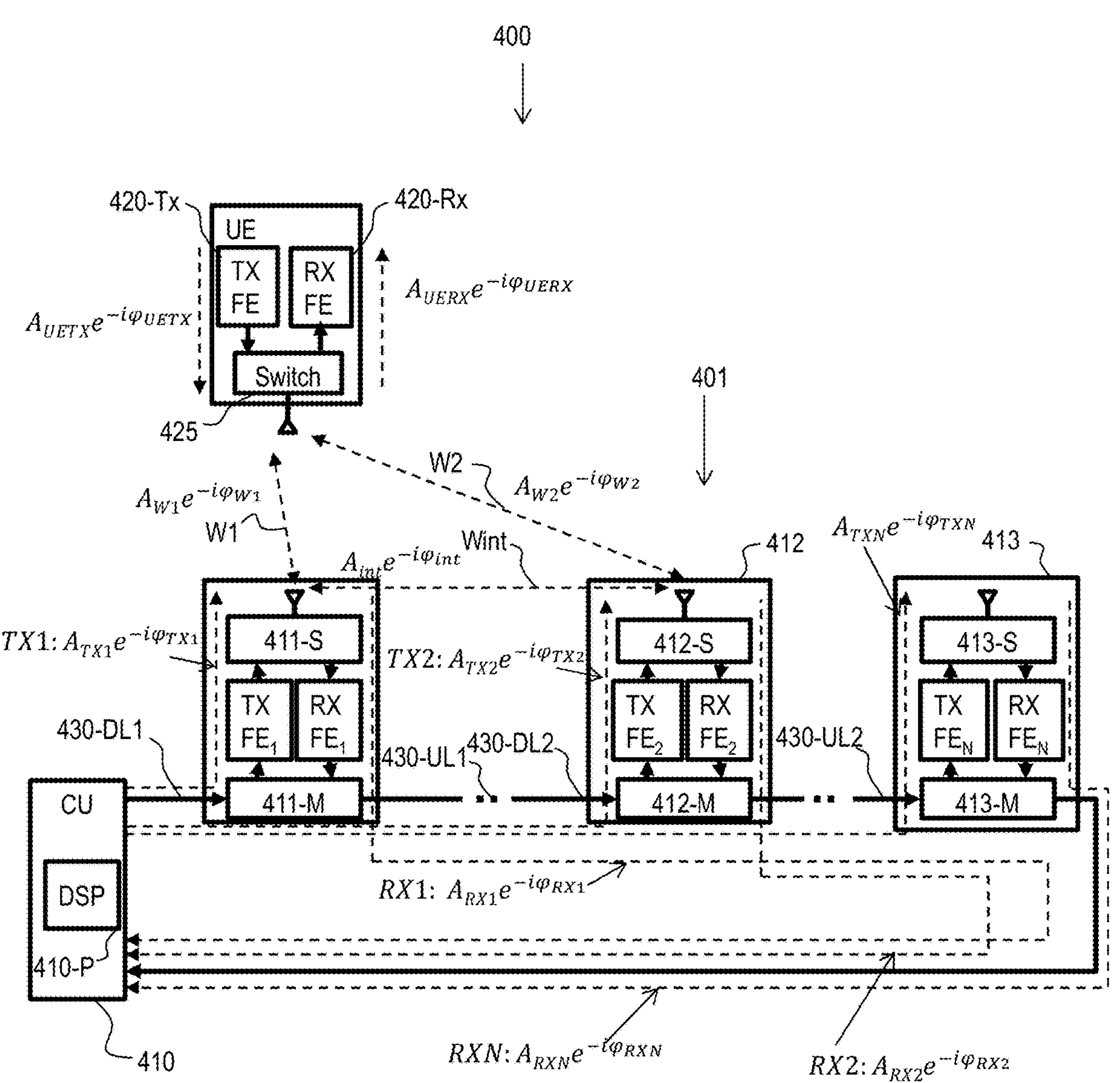
FIG. 4 illustrates further exemplifying embodiments of a D-MIMO system and a wireless communications device.

Embodiments herein will now be described with reference to FIG. 4. FIG. 4 is a schematic block diagram of an exemplary embodiment a RAN 400 comprising a D-MIMO system 401.

The D-MIMO system comprises a CU 410 with Digital Signal Processing, DSP, for example implemented by a digital signal processor 410-P. The DSP may be used for processing UL radio signals for channel estimation and/or for synchronizing the DL radio signals.

The D-MIMO system 401 further comprises a first RRH 411 and a second RRH 412 for wireless communication with a wireless communications device 420.

The D-MIMO system 401 further comprises an analogue optical fronthaul link 430 between the CU 410 and the respective remote radio-head 411, 412 for transmitting and receiving the DL and UL radio signals between the CU 410 and the respective remote radio-head 411, 412. As mentioned above, both RFoF and IFoF signals may be transmitted on the optical fronthaul link 430, e.g., depending on whether or not the frequency of the wireless signal is above or below a BW of the optical transmitters used in the CU 410 and the RRHs 411, 412 for transmission on the optical fronthaul link 430.

In FIG. 4 the analogue optical fronthaul link 430 is illustrated with a ring topology. Other topologies, such as star, mesh, tree, ring, point-to-point, circular, hybrid, and bus topology is also possible.

In general each RRH 411, 412 and the wireless communications device 420 may comprise one or more antennas in order to communicate wirelessly with each other. However, FIG. 4 illustrates a simplified embodiment wherein each RRH 411, 412 and the wireless communications device 420 each comprise a single antenna. Thus, in FIG. 4 the first RRH 411 comprises a first antenna, the second RRH 412 comprises a second antenna and the wireless communications device 420 comprises a third antenna.

In order to communicate wirelessly with the RAN 400 the wireless communications device 420 may also comprise one or more receiver chains 420-Rx and one or more transmitter chains 420-Tx.

The one or more receiver chains and/or the one or more transmitter chains may be implemented by an RF FE such as a receiver FE and/or a transmitter FE.

In order to communicate wirelessly with the RAN 400 the wireless communications device 420 may further comprise a switch 425.

Also the first and second RRHs 411, 412 may comprise a respective switch 411-S, 412-S and respective one or more receiver chains RX $FE_1$, RX $FE_2$ and/or respective one or more transmitter chains TX $FE_1$, TX $FE_2$.

In order to transmit signals to and receive signals from the CU 410 the first and second RRHs 411, 412 may each comprise a respective OADM 411-M, 412-M.

To synchronize all RRHs, such as the first RRH 411 and the second RRH 412, the RRHs are synchronized to a reference RRH, such as the first RRH 411, by means of reciprocity measurements. This scheme not only compensates the amplitude change and phase rotations due to the RF Front Ends (FEs) but also the changes due to the analogue optical fronthaul link 430 and optical multiplexers/demultiplexers, e.g., OADMs in the RRHs. Furthermore, FIG. 4 shows the amplitude change and phase shift of each path between the CU 410 and the wireless communications device 420, i.e., the transmitting, receiving and wireless paths.

Figure 5:
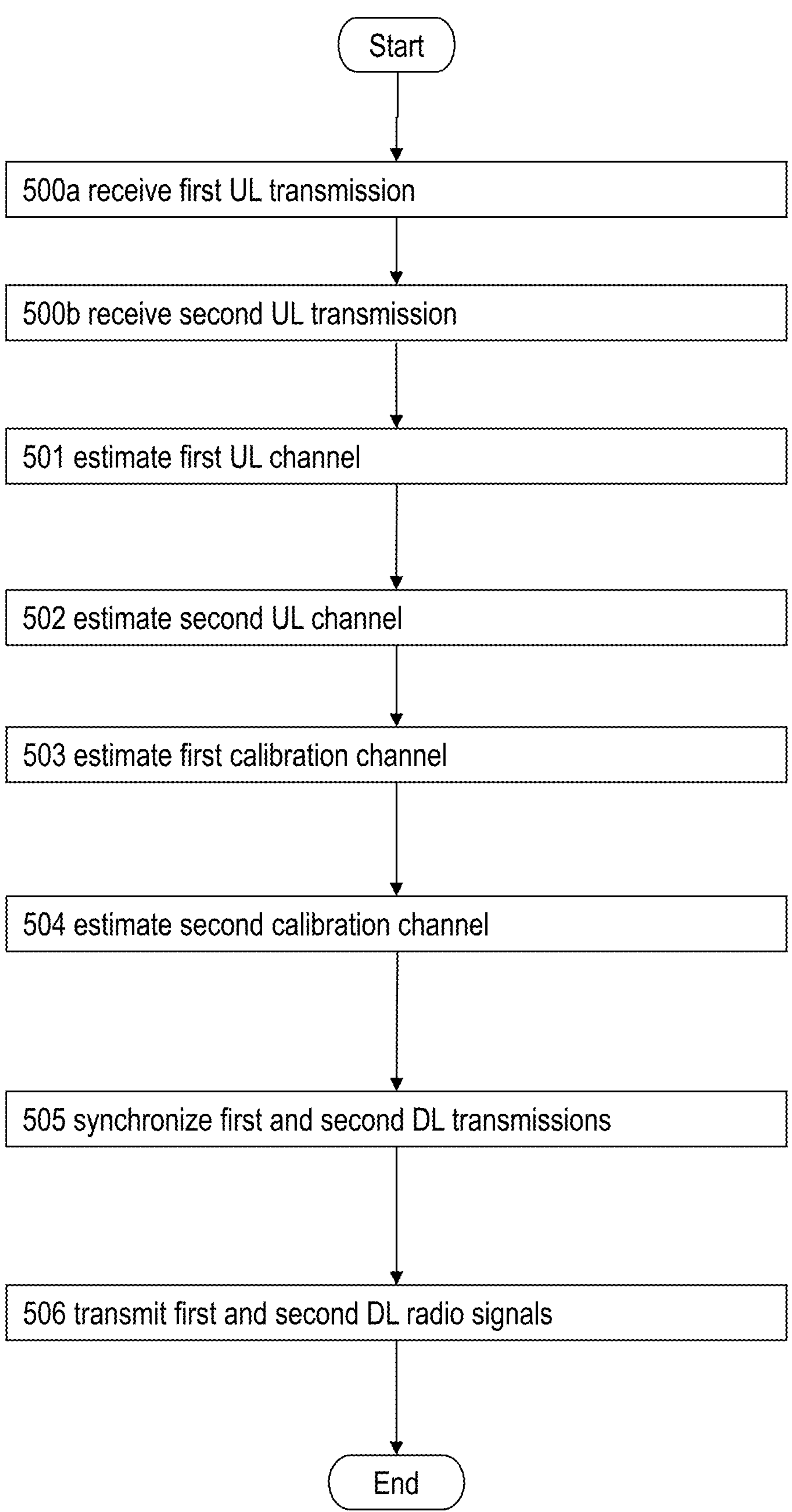
FIG. 5 illustrates exemplifying embodiments of a method for transmission of DL radio signals in a D-MIMO system.

Embodiments for transmission of DL radio signals in the D-MIMO system 401 will now be described with reference to FIG. 5. FIG. 5 is a flow chart describing a method for transmission of DL radio signals in the D-MIMO system according to embodiments herein. Specifically, the method may be for coherent joint transmission of DL radio signals. Thus, the method may be said to be a calibration method for calibrating transmissions from the first RRH 411 and the second RRH 412 such that the transmissions align in phase at the wireless communications device 420.

In some embodiments the D-MIMO system 401 further comprises one or more further remote radio-heads 413. Then the method may be performed for each pair of the remote radio-heads 411-412, 411-413 comprising the first remote radio-head 411.

For example, the second RRH 412 is calibrated to the first RRH 411 and the further remote radio-head 413 may be also calibrated to the first remote radio-head 411. By calculating the internal calibration between all pairs of RRHs comprising a reference RRH, such as the first remote radio-head 411, it is possible to synchronize them to a common reference and phase align the transmitted signals of all RRHs.

The further remote radio-heads 413 may comprise corresponding components as the first RRH 411. For example, also the third RRHs 413 may comprise a switch 413-S and one or more receiver chains RX $FE_N$ and/or one or more transmitter chains TX $FE_N$.

In order to transmit signals to and receive signals from the CU 410 the third RRHs 413 may comprise an OADM 413-M.

The method may also be performed for further pairs of remote radio-heads 412-413 not comprising the first remote radio-head 411. For example, if a received power of signals transmitted between the first remote radio-head 411 and one of the one or more further remote radio-heads 413 is below a threshold for received power, then the method may be performed for further pairs of remote radio-heads 412-413 not comprising the first remote radio-head 411 to increase the range for coherent joint transmission of DL radio signals from the D-MIMO system 401.

In some embodiments herein the RAN 400 operates based on wireless channel reciprocity. For example, the RAN 400 may operate according to a principle of reciprocity of DL and UL channels. That means that reciprocity of channel estimation may apply. This may for example be the case in Time Division Duplex (TDD)-based RANs.

In some embodiments herein the optical fronthaul link 430 is at least partly fibre-based.

In other embodiments herein the optical fronthaul link 430 is at least partly based on free space optics. Yet other embodiments combine fibre-based optics and free space optics.

The radio signals may be transmitted between the CU 410 and the respective first and second remote radio-head 411, 412 by modulating an optical carrier that propagates through the optical fronthaul link 430 with the radio signals in analogue form.

The radio signals may be transmitted between the CU 410 and the respective first and second remote radio-head 411, 412 without using a digital link.

As mentioned above, by using an analogue link and analogue radio signals the complexity of the first and second RRHs 411, 412 may be reduced.

The method may be performed by the CU 410.

A joint calibration scheme which is needed to synchronize all APs will now be described. If the APs are properly synchronized, the signals transmitted by all APs add coherently, i.e., with the same phase at the wireless communications device 420.

With no loss of generality, the first RRH 411 is used as the reference AP. As described before, the UL and DL channels are not only determined by the wireless channels, but also influenced by the wired fronthaul links, and the APs and the FEs of the wireless communications device 420. The following expressions are derived based on the reference signs used in FIG. 4. The terminology of the reference signs is used to emphasize the contributions of magnitudes, represented by capital letter A and a subscript corresponding to the affecting path, and phases, represented by the Greek letter (p (phi) and a subscript corresponding to the affecting path, of the different paths in the communication system as shown in detail in FIG. 4. The different paths are illustrated in FIG. 4 with dashed lines with arrows in the direction of the signal flow.

Examples of such paths are: a first wireless path W1 between the wireless communications device 420 and the first remote radio-head 411 and a second wireless path W2 between the wireless communications device 420 and the second remote radio-head 412.

The wireless paths W1, W2 may also be referred to as wireless channels W1, W2. The wireless channels W1, W2 may each be an UL channel and/or a DL channel, depending on whether signals are transmitted in DL or in UL.

There are also further paths such as a first transmitter path TX1 comprising transmitter FEs of the first RRH 411 plus the FH DL direction fibre, i.e., comprising a first DL part 430-DL1 of the analogue optical fronthaul link 430 between the CU 410 and the first remote radio-head 411.

Another path is a second transmitter path TX2 comprising transmitter FEs of the second RRH 412 plus the FH DL direction fibre, i.e., comprising a second DL part 430-DL2 of the analogue optical fronthaul link 430 between the CU 410 and the first remote radio-head 411.

Receiver paths of the D-MIMO system comprise receiver FEs of the RRHs plus the FH UL direction fibre. For example, a first receiver path RX1 comprises receiver FEs of the first RRH 411 plus the FH UL direction fibre, i.e., comprising a first UL part 430-UL1 of the analogue optical fronthaul link 430 between the CU 410 and the first remote radio-head 411. A second receiver path RX2 comprises receiver FEs of the second RRH 412 plus the FH UL direction fibre, i.e., comprising a second UL part 430-UL2 of the analogue optical fronthaul link 430 between the CU 410 and the second remote radio-head 412.

Further paths comprise FEs of the wireless communications device 420: a transmitter path UETX of the wireless communications device 420 and a receiver path UERX of the wireless communications device 420.

For example, when DL signals passes from the CU 410 to the first antenna they are affected by a first transmitter amplitude $A_{TX1}$ and a first transmitter phase $\varphi_{TX1}$ by the transmitter FEs of the first RRH 411 and the FH DL direction fibre path, i.e., by the first transmitter path TX1 When DL signals passes from the CU 410 to the second antenna they are affected by a second transmitter amplitude $A_{TX2}$ and a second transmitter phase $\varphi_{TX2}$, i.e., by the second transmitter path TX2

Similarly, when UL signals passes from the first antenna to the CU 410 they are affected by a first receiver amplitude $A_{RX1}$ and a first receiver phase $\varphi_{RX1}$, that is by the first receiver path RX1.

When UL signals passes from the second antenna to the CU 410 they are affected by a second receiver amplitude $A_{RX2}$ and a second receiver phase $\varphi_{RX2}$, that is by the second receiver path RX2.

Signals transmitted from the wireless communications device 420 experiences a transmitter amplitude $A_{UETX}$ and a transmitter phase $\varphi_{UETX}$. That is, the signals are affected by the transmitter path UETX.

Signals received by the wireless communications device 420 experiences a receiver amplitude $A_{UERX}$ and a receiver phase $\varphi_{UERX}$ That is, the signals are affected by the receiver path UERX.

For the channel estimation, if a reference signal from the wireless communications device 420 has amplitude 1 and phase equal to 0 for simplicity, the UL measured channel corresponding to the first RRH 411 is given by:

$$\text{Channel wireless communications device 420 – first } RRH \text{ 411 } (UL): \hat{C}_{UE,1} = A_{UETX}e^{-i\varphi_{UETX}} \cdot A_{W1}e^{-i\varphi_{W1}} \cdot A_{RX1}e^{-i\varphi_{RX1}} \cdot A_{err1}e^{-i\varphi_{err1}} \quad (1)$$

where $A_{err1}e^{-i\varphi_{err1}}$ is a term representing the errors of the channel estimates related to the first RRH 411. $A_{W1}$ represents the amplitude change due to the first wireless path W1. $\phi_{W1}$ represents the phase change due to the first wireless path W1. Furthermore, the transmitted signal from the first RRH 411 will experience the following amplitude change and phase rotation:

$$\text{Channel first } RRH\ 411 - \text{wireless communications device } 420\ (DL): C_{1,UE} = A_{TX1}e^{-i\varphi_{TX1}} \cdot A_{W1}e^{-i\varphi_{W1}} \cdot A_{UERX}e^{-i\varphi_{UERX}} \tag{2}$$

Since reciprocity holds between the DL and UL wireless channels, to remove the effect of the wireless channel, the first RRH 411 DL transmission is compensated with the measured UL channel:

$$C_{1,UE} \cdot \frac{1}{\hat{C}_{UE,1}} = \frac{A_{TX1}}{A_{UETX}} \cdot \frac{A_{UERX}}{A_{RX1}} \cdot \frac{e^{-i(\varphi_{TX1}+\varphi_{UERX})}}{e^{-i(\varphi_{UETX}+\varphi_{RX1})}} \cdot \frac{1}{A_{err1}e^{-i\varphi_{err1}}} \tag{3}$$

In the same way, the UL measured channel and DL channel between the second RRH 412 and the wireless communications device 420 are given by:

$$\text{Channel wireless communications device } 420 - AP2\ (UL): \hat{C}_{UE,2} = A_c \cdot A_{UETX}e^{-i\varphi_{UETX}} \cdot A_{W2}e^{-i\varphi_{W2}} \cdot A_{RX2}e^{-i\varphi_{RX2}} \cdot A_{err2}e^{-i\varphi_{err2}} \tag{4}$$

$$\text{Channel AP2} - \text{wireless communications device } 420\ (DL): C_{2,UE} = A_c \cdot A_{TX2}e^{-i\varphi_{TX2}} \cdot A_{W2}e^{-i\varphi_{W2}} \cdot A_{UERX}e^{-i\varphi_{UERX}} \tag{5}$$

where $A_{err2}e^{-i\varphi_{err2}}$ is a term representing the errors of the channel estimates related to the second RRH 412. Similarly as above, $A_{W2}$ represents the amplitude change due to the second wireless path W2. $\phi_{W2}$ represents the phase change due to the second wireless path W2.

If the second RRH 412 DL transmission is compensated with the measured UL channel, the following is obtained:

$$C_{2,UE} \cdot \frac{1}{\hat{C}_{UE,2}} = \frac{A_{TX2}}{A_{UETX}} \cdot \frac{A_{UERX}}{A_{RX2}} \cdot \frac{e^{-i(\varphi_{TX2}+\varphi_{UERX})}}{e^{-i(\varphi_{UETX}+\varphi_{RX2})}} \cdot \frac{1}{A_{err1}e^{-i\varphi_{err2}}} \tag{6}$$

To synchronize the second RRH 412 to the first RRH 411, an internal calibration based on reciprocity between the first RRH 411 and the second RRH 412 is calculated. First, a known calibration signal is transmitted from the first RRH 411 and received by the second RRH 412 and then is transmitted from the second RRH 412 and received by the first RRH 411. Subsequently, the second RRH 412 synchronization coefficient is calculated by taking the ratio of the previous two measurements. For simplicity, if the calibration signal has amplitude 1 and phase equal to 0, the coefficient is:

$$\frac{C_{1,2}}{C_{2,1}} = \frac{A_{TX1}}{A_{TX2}} \cdot \frac{A_{RX2}}{A_{RX1}} \cdot \frac{e^{-i(\varphi_{TX1}+\varphi_{RX2})}}{e^{-i(\varphi_{TX2}+\varphi_{RX1})}} \cdot A_{err\_int}e^{-i\varphi_{err\_int}} \tag{7}$$

where $A_{err\_int}e^{-i\varphi_{err\_int}}$ is a term representing the errors of the channel estimates related to the internal synchronization of the first RRH 411 and the second RRH 412. The signal generation and signal processing of this calibration procedure take place in the CU 410.

By multiplying the compensated DL transmission from the second RRH 412 (6) by the calibration coefficient (7), the following expression is obtained:

$$C_{2,UE} \cdot \frac{1}{\hat{C}_{UE,2}} \cdot \frac{C_{1,2}}{C_{2,1}} = \frac{A_{TX1}}{A_{UETX}} \cdot \frac{A_{UERX}}{A_{RX1}} \cdot \frac{e^{-i(\varphi_{TX1}+\varphi_{UERX})}}{e^{-i(\varphi_{UETX}+\varphi_{RX1})}} \cdot \frac{A_{err_{int}}e^{-i\varphi_{err_{int}}}}{A_{err2}e^{-i\varphi_{err2}}} \tag{8}$$

The expressions (8) and (3) are the same if the error terms are excluded, which means that after multiplying the compensated DL transmission from the second RRH 412 (6) by the calibration coefficient (7) the amplitude change and phase rotation of the transmitted signals from the first and second RRHs 411, 412 at the wireless communications device 420 are the same satisfying the requirements for CJT. It is noted that the system performance may degrade due to the error terms. However, this performance degradation is comparable to conventional co-located MIMO systems due to practical channel estimation errors.

It is to be noted that the calibration scheme disclosed by embodiments herein may be generalized to any number of RRHs and that it may for example be carried out in TDD systems.

In order to calibrate DL radio signals from the second RRH 412 with respect to DL radio signals from the first RRH 411 the wireless communications device 420 may transmit one or more UL reference radio signals to the first RRH 411 and the second RRH 412. The one or more UL reference radio signals may for example be SRSs or similar signals.

As mentioned above, if a reference signal from the wireless communications device 420 has amplitude 1 and phase equal to 0 for simplicity, the UL measured channel corresponding to the first RRH 411 is given by:

$$\text{Channel wireless communications device } 420 - \text{first } RRH\ 411(UL): \hat{C}_{UE,1} = A_{UETX}e^{-i\varphi_{UETX}} \cdot A_{W1}e^{-i\varphi_{W1}} \cdot A_{RX1}e^{-i\varphi_{RX1}} \cdot A_{err1}e^{-i\varphi_{err1}} \tag{1}$$

where $A_{err1}e^{-i\varphi_{err1}}$ is a term representing the errors of the channel estimates related to the first RRH 411.

Furthermore, the transmitted signal from the first RRH 411 will experience the following amplitude change and phase rotation:

Action **500*a***

The CU 410 receives a first UL transmission from the wireless communications device 420 via the first remote radio-head 411 over the analogue optical fronthaul link 430. The first UL transmission may comprise first UL reference radio signals such as SRSs.

Action **500*b***

The CU 410 receives a second UL transmission from the wireless communications device 420 via the second remote radio-head 412 over the analogue optical fronthaul link 430. The second UL transmission may be a same transmission as the first transmission, e.g., a multicast or broadcast transmission. Then received second UL reference radio signals are the same reference radio signals as the first UL reference radio signals.

In other embodiments the second UL transmission is a transmission which is separate from the first UL transmission.

Action 501

The CU 410 estimates a first effective UL channel for signals from the wireless communications device 420 via the first remote radio-head 411 based on applying DSP to the first UL transmission. The first effective UL channel includes: a wireless UL channel W1 between the wireless communications device 420 and the first remote radio-head 411, at least one optical component of a first UL part 430-UL1 of the analogue optical fronthaul link 430 between the first remote radio-head 411 and the CU 410, at least one component of a receiver chain RX $FE_1$ of the first remote radio-head 411 and at least one component of a transmitter chain TX FE of the wireless communications device 420.

Thus, the CU 410 may estimate the first effective UL channel according to expression (1) above. As mentioned, expression (1) is calculated in the digital domain.

The receiver chains and/or the transmitter chains may comprise an RF FE which may comprise the at least one component of the receiver chain and/or the at least one component of the transmitter chain.

Action 502

The CU 410 estimates a second effective UL channel for signals from the wireless communications device 420 to the second remote radio-head 412 based on applying DSP to the second UL transmission. The second effective UL channel includes: a wireless UL channel W2 between the wireless communications device 420 and the second remote radio-head 412, at least one optical component of a second UL part 430-UL2 of the analogue optical fronthaul link 430 between the second remote radio-head 412 and the CU 410, at least one component of a receiver chain RX $FE_2$ of the second remote radio-head 412 and at least one component of the transmitter chain TX FE of the wireless communications device 420.

Action 503

The CU 410 estimates a first calibration channel based on applying DSP to a first reference radio signal transmitted wirelessly from the first remote radio-head 411 and received wirelessly at the second remote radio-head 412.

Action 504

The CU 410 estimates a second calibration channel based on applying DSP to a second reference radio signal transmitted wirelessly from the second remote radio-head 412 and received wirelessly at the first remote radio-head 411. Estimating the UL channels and the calibration channels may respectively comprise a respective measurement, by the CU 410, of amplitude and phase of the respective UL radio signal and reference radio signal.

The respective reference radio signal may be generated from a Zadoff-Chu (ZC) sequence. Signals generated from Zadoff-Chu sequences are exemplary signals that may be used for the internal calibration due to its advantageous properties such as constant amplitude, i.e., low peak-to-average power ratio, and due to the fact that its auto-correlation with a cyclically shifted version of itself is zero allowing the simultaneous calibration of several antenna pairs. Signals based on ZC sequences are commonly used, for example, during the random access procedure with a Physical Random Access Channel and for channel estimation procedures.

Action 505

The CU 410 synchronizes a first DL transmission of a first DL radio signal from the first remote radio-head 411 to the wireless communications device 420 with a second DL transmission of a second DL radio signal from the second remote radio-head 412 to the wireless communications device 420 such that at the wireless communications device 420 a respective phase of the received first and second radio signals is phase aligned with each other. In other words, the CU 410 may synchronize the transmissions in order to compensate for variations of amplitude and/or phase in relation to the first DL transmission of the first DL radio signal from the first remote radio-head 411 such that coherent joint transmission is achieved from the first remote radio-head 411 and the second remote radio-head 412. The DL transmissions are wireless transmissions, i.e., radio signals are transmitted wirelessly.

The synchronizing is performed by:

a) compensating the first DL transmission of the first DL radio signal from the first remote radio-head 411 based on the estimated first effective UL channel; and b) compensating the second DL transmission of the second DL radio signal from the second remote radio-head 412 based on the estimated second effective UL channel, and further based on the estimated first calibration channel and the estimated second calibration channel.

Compensating may include adjusting the amplitude and/or phase of the DL radio signals. For example, the DL radio signals may be compensated or adjusted by multiplying the DL radio signals with calibration coefficients which are based on the estimated channels.

The CU 410 may compensate the second DL transmission of the second DL radio signal from the second remote radio-head 412 by:

calculating a first DL calibration coefficient for the second remote radio-head 412 based on the estimated second effective UL channel;

calculating a second DL calibration coefficient for the second remote radio-head 412 based on a ratio of the estimated first calibration channel to the estimated second calibration channel; and multiplying the second DL radio signal for transmission from the second remote radio-head 412 to the wireless communications device 420 with the first and second DL calibration coefficients. The multiplication with the first and second DL calibration coefficients compensates for example for variations in the analogue optical FH link 430, the transmitters of the RRHs and the wireless channel W1, W2 and the RF front-ends of the wireless communications device 420.

The CU 410 may compensate the first DL transmission of the first DL radio signal from the first remote radio-head 411 and may compensate the second DL transmission of the second DL radio signal from the second remote radio-head 412 in the digital domain.

As mentioned above, by multiplying the compensated DL transmission from the second RRH 412 (6) by the calibration coefficient (7), the following expression is obtained:

$$C_{2,UE}\cdot\frac{1}{\hat{C}_{UE,2}}\cdot\frac{C_{1,2}}{C_{2,1}}=\frac{A_{TX1}}{A_{UETX}}\cdot\frac{A_{UERX}}{A_{RX1}}\cdot\frac{e^{-i(\varphi_{TX1}+\varphi_{UERX})}}{e^{-i(\varphi_{UETX}+\varphi_{RX1})}}\cdot\frac{A_{err_{int}}e^{-i\varphi_{err_{int}}}}{A_{err2}e^{-i\varphi_{err2}}}\tag{8}$$

The expressions (8) and (3) are the same if the error terms are excluded which means that after multiplying the compensated DL transmission from the second RRH 412 (6) by the calibration coefficient (7) the amplitude change and phase rotation of the transmitted signals from the first and second RRHs 411, 412 at the wireless communications device 420 are the same satisfying the requirements for CJT.

As mentioned above, to remove the effect of the wireless channel, the first RRH 411 DL transmission may be compensated with the measured UL channel:

$$C_{1,UE} \cdot \frac{1}{\hat{C}_{UE,1}} = \frac{A_{TX1}}{A_{UETX}} \cdot \frac{A_{UERX}}{A_{RX1}} \cdot \frac{e^{-i(\varphi_{TX1}+\varphi_{UERX})}}{e^{-i(\varphi_{UETX}+\varphi_{RX1})}} \cdot \frac{1}{A_{err1}e^{-i\varphi_{err1}}} \tag{3}$$

Thus, the first calibration channel may include a wireless calibration channel Wint between the first remote radio-head 411 and the second remote radio-head 412, at least one optical component of a first DL part 430-DL1 of the analogue optical fronthaul link 430 between the CU 410 and the first remote radio-head 411, at least one component of a transmitter chain TX $FE_1$ of the first remote radio-head 411, the at least one component of the receiver chain RX $FE_2$ of the second remote radio-head 412 and the at least one optical component of the second UL part 430-UL2 of the analogue optical fronthaul link 430. In other words, the analogue optical fronthaul link 430 may be divided into different parts, both in DL and UL. A respective part is located between the CU 410 and a respective remote radio-head. The first DL part 430-DL1 of the analogue optical fronthaul link 430 is a part which is located between the CU 410 and the first remote radio-head 411. A second DL part 430-DL2 of the analogue optical fronthaul link 430 is a part which is located between the CU 410 and the second remote radio-head 412.

As also mentioned above, to synchronize the second RRH 412 to the first RRH 411, an internal calibration based on reciprocity between the first RRH 411 and the second RRH 412 may be calculated. First, a known calibration signal may be transmitted from the first RRH 411 and received by the second RRH 412 and then transmitted from the second RRH 412 and received by the first RRH 411. Subsequently, the second RRH 412 synchronization coefficient is calculated by taking the ratio of the previous two measurements. For simplicity, if the calibration signal has amplitude 1 and phase equal to 0, the coefficient is:

$$\frac{C_{1,2}}{C_{2,1}} = \frac{A_{TX1}}{A_{TX2}} \cdot \frac{A_{RX2}}{A_{RX1}} \cdot \frac{e^{-i(\varphi_{TX1}+\varphi_{RX2})}}{e^{-i(\varphi_{TX2}+\varphi_{RX1})}} \cdot A_{err\_int}e^{-i\varphi_{err\_int}} \tag{7}$$

where $A_{err\_int}e^{-\varphi_{err\_int}}$ is a term representing the errors of the channel estimates related to the internal synchronization of the first RRH 411 and the second RRH 412.

Thus, the second calibration channel may include the wireless calibration channel Wint between the second remote radio-head 412 and the first remote radio-head 411, at least one optical component of the second DL part 430-DL2 of the analogue optical fronthaul link 430 between the CU 410 and the second remote radio-head 412, at least a component of a transmitter chain TX $FE_2$ of the second remote radio-head 412, the at least one component of the receiver chain RX FE, of the first remote radio-head 411 and the at least one optical component of the first UL part 430-UL1 of the analogue optical fronthaul link 430.

Since all the DSP is centralized in the CU 410, the CU 410 performs all digital calculations related to channel estimation and calibration between the RRHs 411, 412, and compensates all DL signals before transmission based on the preceding calculations.

Action 506

The CU 410 transmits the first DL radio signal to the first remote radio-head 411 and the second DL radio signal to the second remote radio-head 411 over the analogue optical fronthaul link 430.

Figure 6:
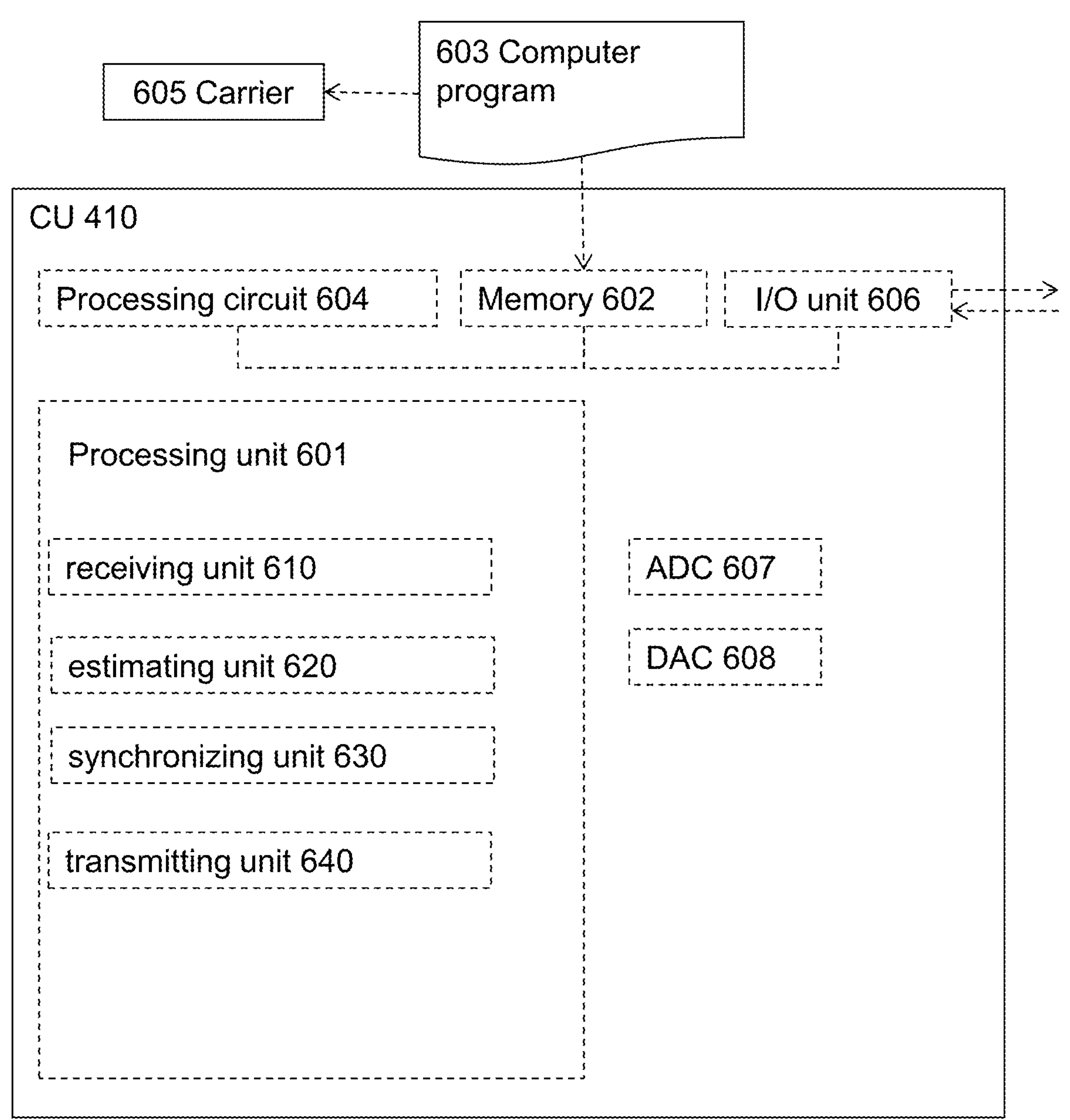
FIG. 6 is a schematic block diagram illustrating embodiments of a central unit of a D-MIMO system.

FIG. 6 illustrates a schematic block diagram of embodiments of the CU 410.

The CU 410 may comprise a processing unit 601 for performing the above method actions. The processing unit 601 may at least partly be a digital processing unit to perform the digital processing mentioned above.

As mentioned above the CU 410 may be configured with DSP for processing UL radio signals for channel estimation and/or for synchronizing DL radio signals.

The processing unit 601 may comprise a receiving unit 610 to receive radio signals, e.g. UL reference radio signals.

The processing unit 601 may comprise an estimating unit 620 to estimate different channels.

The processing unit 601 may comprise a synchronizing unit 630 to synchronize DL radio signals from different remote radio heads.

The processing unit 601 may comprise a transmitting unit 640 to transmit DL radio signals to different remote radio heads over the analogue optical link 430.

The CU 410 may further comprise an Analogue-to-Digital Converter (ADC) 607 to convert incoming analogue signals to digital signals and a Digital-to-Analogue Converter (DAC) 608 to convert digital signals from the processing unit 601 to outgoing analogue signals.

The CU 410 is configured to, e.g., by the receiving unit 610 being configured to, receive the first UL transmission from the wireless communications device 420 via the first and the second remote radio-head 411 over the analogue optical fronthaul link 430.

The CU 410 is further configured to, e.g., by the receiving unit 610 being configured to, receive the second UL transmission from the wireless communications device 420 via the second remote radio-head 412 over the analogue optical fronthaul link 430.

The CU 410 is further configured to, e.g., by the estimating unit 620 being configured to, estimate the first effective UL channel for signals from the wireless communications device 420 via the first remote radio-head 411 based on applying DSP to the first UL transmission. The first effective UL channel includes: the wireless UL channel W1 between the wireless communications device 420 and the first remote radio-head 411, the at least one optical component of a first UL part 430-UL1 of the analogue optical fronthaul link 430 between the first remote radio-head 411 and the CU 410, the at least one component of the receiver chain RX $FE_1$ of the first remote radio-head 411 and at least one component of a transmitter chain TX FE of the wireless communications device 420.

The CU 410 is further configured to, e.g., by the estimating unit 620 being configured to, estimate the second effective UL channel for signals from the wireless communications device 420 to the second remote radio-head 412 based on applying DSP to the second UL transmission.

The second effective UL channel includes: a wireless UL channel W2 between the wireless communications device 420 and the second remote radio-head 412, at least one optical component of a second UL part 430-UL2 of the analogue optical fronthaul link 430 between the second remote radio-head 412 and the CU 410, at least one component of a receiver chain RX FE2 of the second remote radio-head 412 and at least one component of the transmitter chain TX FE of the wireless communications device 420.

The CU 410 is further configured to, e.g., by the estimating unit 620 being configured to, estimate a first calibration channel based on applying DSP to a first reference radio signal transmitted wirelessly from the first remote radio-head 411 and received wirelessly at the second remote radio-head 412.

The CU 410 is further configured to, e.g., by the estimating unit 620 being configured to, estimate a second calibration channel based on applying DSP to a second reference radio signal transmitted wirelessly from the second remote radio-head 412 and received wirelessly at the first remote radio-head 411.

The CU 410 is further configured to, e.g., by the synchronizing unit 630 being configured to, synchronize the first DL transmission of the first DL signal from the first remote radio-head 411 to the wireless communications device 420 with the second DL transmission of the second DL signal from the second remote radio-head 412 to the wireless communications device 420 such that at the wireless communications device 420 the respective phase of the received first and second radio signals is phase aligned with each other.

The CU 410 is configured to synchronize by being configured to:

a) compensate the first DL transmission of the first radio signal from the first remote radio-head 411 to the wireless communications device 420 based on the estimated first effective UL channel; and b) compensate the second DL transmission of the second DL radio signal from the second remote radio-head 412 to the wireless communications device 420 based on the estimated second effective UL channel, and further based on the estimated first calibration channel and the estimated second calibration channel.

The CU 410 is further configured to, e.g., by the transmitting unit 640 being configured to, transmit the first DL radio signal to the first remote radio-head 411 and the second DL radio signal to the second remote radio-head 411 over the analogue optical fronthaul link 430.

As mentioned above, the first calibration channel may include the wireless calibration channel Wint between the first remote radio-head 411 and the second remote radio-head 412, at least one optical component of a first DL part 430-DL1 of the analogue optical fronthaul link 430 between the CU 410 and the first remote radio-head 411, at least one component of a transmitter chain TX FE1 of the first remote radio-head 411, the at least one component of the receiver chain RX FE2 of the second remote radio-head 412 and the at least one optical component of the second UL part 430-UL2 of the analogue optical fronthaul link 430.

The second calibration channel may include the wireless calibration channel Wint between the second remote radio-head 412 and the first remote radio-head 411, at least one optical component of a second DL part 430-DL2 of the analogue optical fronthaul link 430 between the CU 410 and the second remote radio-head 412, at least a component of a transmitter chain TX FE2 of the second remote radio-head 412, the at least one component of the receiver chain RX FE1 of the first remote radio-head 411 and the at least one optical component of the first UL part 430-UL1 of the analogue optical fronthaul link 430.

In some embodiments the CU 410 is configured to compensate the second DL transmission of the second radio signal from the second remote radio-head 412 by being configured to:

calculate a first DL calibration coefficient for the second remote radio-head 412 based on the estimated second effective UL channel;

calculate a second DL calibration coefficient for the second remote radio-head 412 based on a ratio of the estimated first calibration channel to the estimated second calibration channel; and multiply the second DL radio signal for transmission from the second remote radio-head 412 to the wireless communications device 420 with the first and second DL calibration coefficients.

As mentioned above the CU 410 may be configured to compensate the first DL transmission of the first DL radio signal from the first remote radio-head 411 and the second DL transmission of the second DL radio signal from the second remote radio-head 412 in the digital domain.

The CU 410 may be configured to, e.g., by the transmitting unit 640 being configured to, transmit the radio signals to the respective first and second remote radio-head 411, 412 by modulating an optical carrier that propagates through the optical fronthaul link 430 with the radio signals in analogue form.

In other words, the CU 410 may be configured to, e.g., by the transmitting unit 640 being configured to, transmit the radio signals to the respective first and second remote radio-head 411, 412 without using a digital interface.

The CU 410 may be configured to, e.g., by the estimating unit 620 being configured to, estimate the UL channels and the calibration channels respectively by being configured to perform a respective measurement of amplitude and phase of the respective UL radio signal and reference radio signal.

The CU 410 may be configured to perform the respective measurement of amplitude and phase of reference radio signals generated from a Zadoff-Chu sequence.

In some embodiments, wherein the D-MIMO system 400 comprises the one or more further remote radio-heads 413, the CU 410 may be configured to perform the described method for each pair of the remote radio-heads 411-412, 411-413 comprising the first remote radio-head 411.

In some embodiments, wherein the received power of signals transmitted between the first remote radio-head 411 and the one of the one or more further remote radio-heads 413 is below the threshold for received power, then CU 410 may be configured to perform the method for further pairs of remote radio-heads 412-413 not comprising the first remote radio-head 411 to increase the range for coherent joint transmission of DL radio signals from the D-MIMO system 401.

The embodiments herein may be also be implemented through a processing circuit 604 e.g. comprising one or more processors, in the CU 410 depicted in FIG. 6, together with computer program code, e.g. computer program, for performing the functions and actions of the embodiments herein. The program code mentioned above may also be provided as a computer program product, for instance in the form of a data carrier carrying computer program code for performing the embodiments herein when being loaded into the CU 410. One such carrier may be in the form of a CD ROM disc. It is however feasible with other data carriers such as a memory stick. The computer program code may furthermore be provided as pure program code on a server and downloaded to the CU 410.

The CU 410 may further comprise a memory 602 comprising one or more memory units. The memory 602 comprises instructions executable by the processing circuit 604 in the CU 410. The memory 602 is arranged to be used to store e.g. information, indications, data, configurations, and applications to perform the methods herein when being executed in the CU 410. The memory 602 may be a non-volatile memory e.g., comprising NAND gates, from which the CU 410 may load its program and relevant data. Updates of the software may be transferred via a wireless connection.

To perform the actions above, embodiments herein provide a computer program 603, comprising computer readable code units which when executed on the CU 410 causes the CU 410 to perform any of the method actions above.

In some embodiments, the computer program 603 comprises instructions, which when executed by a processor, such as the processing circuit 604 of the CU 410, cause the processor to perform any of the method actions above.

For example, when the computer program 603, comprising computer readable code units, is executed on a D-MIMO system 401 it causes the D-MIMO 401 system to perform the method actions above.

In some embodiments, a carrier 605 comprises the computer program 603 wherein the carrier 605 is one of an electronic signal, an optical signal, a radio signal and a computer readable medium.

The carrier may further be one of an electromagnetic signal, a magnetic signal, an electric signal, a radio signal, a microwave signal.

To perform the method actions above, the CU 410 may comprise an Input and Output (I/O) unit 606. The I/O unit 606 may further be part of one or more user interfaces. However, in some other embodiments the I/O unit 606 comprises transmitters and/or receivers, such as optical transmitters and/or receivers. For example, the I/O unit 606 may perform the actions described above as performed by the transmitting unit 640.

Those skilled in the art will appreciate that the modules and/or units in the CU 410 described above may refer to a combination of analogue and digital circuits, and/or one or more processors configured with software and/or firmware, e.g., stored in the CU 410, that when executed by, e.g., the processing circuit 601, above causes the CU 410 and/to perform the method actions above. The processing circuit 601, as well as the other digital hardware, may be included in a single Application-Specific Integrated Circuitry (ASIC), or several processors and various digital hardware may be distributed among several separate components, whether individually packaged or assembled into a system-on-a-chip (SoC).

As used herein, the term "module" and the term "unit" may refer to one or more functional modules or units, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a cavity-providing means, electrical interconnect-providing means and arranging means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method for transmission of DownLink, DL, radio signals in a Distributed Multiple Input Multiple Output, D-MIMO, system of a Radio Access Network, RAN, the D-MIMO system comprising a Central Unit, CU, with Digital Signal Processing, DSP, for processing UpLink, UL, radio signals for channel estimation and/or for synchronizing the DL radio signals, a first remote radio-head and a second remote radio-head for wireless communication with a wireless communications device, an analogue optical fronthaul link between the CU and the respective remote radio-head for transmitting and receiving the DL and UL radio signals between the CU and the respective remote radio-head, the method comprising:

receiving, by the CU, a first UL transmission from the wireless communications device via the first remote radio-head over the analogue optical fronthaul link;

receiving, by the CU, a second UL transmission from the wireless communications device via the second remote radio-head over the analogue optical fronthaul link;

estimating, by the CU, a first effective UL channel for signals from the wireless communications device via the first remote radio-head based on applying DSP to the first UL transmission, wherein the first effective UL channel includes: a wireless UL channel between the wireless communications device and the first remote radio-head, at least one optical component of a first UL part of the analogue optical fronthaul link between the first remote radio-head and the CU, at least one component of a receiver chain of the first remote radio-head and at least one component of a transmitter chain of the wireless communications device;

estimating, by the CU, a second effective UL channel for signals from the wireless communications device to the second remote radio-head based on applying DSP to the second UL transmission, wherein the second effective UL channel includes: a wireless UL channel between the wireless communications device and the second remote radio-head, at least one optical component of a second UL part of the analogue optical fronthaul link between the second remote radio-head and the CU, at least one component of a receiver chain of the second remote radio-head and at least one component of the transmitter chain of the wireless communications device;

estimating, by the CU, a first calibration channel based on applying DSP to a first reference radio signal transmitted wirelessly from the first remote radio-head and received wirelessly at the second remote radio-head;

estimating, by the CU, a second calibration channel based on applying DSP to a second reference radio signal transmitted wirelessly from the second remote radio-head and received wirelessly at the first remote radio-head;

synchronizing, by the CU, a first DL transmission of a first DL radio signal from the first remote radio-head to the wireless communications device with a second DL transmission of a second DL radio signal from the second remote radio-head to the wireless communications device such that at the wireless communications device a respective phase of the received first and second radio signals is phase aligned with each other, wherein synchronizing is performed by a) compensating, by the CU, the first DL transmission of the first DL radio signal from the first remote radio-head based on the estimated first effective UL channel; and b) compensating, by the CU, the second DL transmission of the second DL radio signal from the second remote radio-head based on the estimated second effective UL channel, and further based on the estimated first calibration channel and the estimated second calibration channel; and transmitting, by the CU, the first DL radio signal to the first remote radio-head and the second DL radio signal to the second remote radio-head over the analogue optical fronthaul link.

2. The method according to claim 1, wherein the first calibration channel includes a wireless calibration channel between the first remote radio-head and the second remote radio-head, at least one optical component of a first DL part of the analogue optical fronthaul link between the CU and the first remote radio-head, at least one component of a transmitter chain of the first remote radio-head, the at least one component of the receiver chain of the second remote radio-head and the at least one optical component of the second UL part of the analogue optical fronthaul link, and wherein the second calibration channel includes the wireless calibration channel between the second remote radio-head and the first remote radio-head, at least one optical component of a second DL part of the analogue optical fronthaul link between the CU and the second remote radio-head, at least a component of a transmitter chain of the second remote radio-head, the at least one component of the receiver chain of the first remote radio-head and the at least one optical component of the first UL part of the analogue optical fronthaul link.

3. The method according to claim 1, wherein compensating the second DL transmission of the second DL radio signal from the second remote radio-head comprises:

calculating, by the CU, a first DL calibration coefficient for the second remote radio-head based on the estimated second effective UL channel;

calculating, by the CU, a second DL calibration coefficient for the second remote radio-head based on a ratio of the estimated first calibration channel to the estimated second calibration channel; and multiplying, by the CU, the second DL radio signal for transmission from the second remote radio-head to the wireless communications device with the first and second DL calibration coefficients.

4. The method according to claim 1, wherein compensating the first DL transmission of the first DL radio signal from the first remote radio-head and compensating the second DL transmission of the second DL radio signal from the second remote radio-head is performed in the digital domain.

5. The method according to claim 1, wherein the radio signals are transmitted between the CU and the respective first and second remote radio-head by modulating an optical carrier that propagates through the optical fronthaul link with the radio signals in analogue form.

6. The method according to claim 1, wherein the radio signals are transmitted between the CU and the respective first and second remote radio-head without using a digital interface.

7. The method according to claim 1, wherein estimating the UL channels and the calibration channels respectively comprises a respective measurement, by the CU, of amplitude and phase of the respective UL radio signal and reference radio signal.

8. The method according to claim 1, wherein the respective reference radio signal is generated from a Zadoff-Chu sequence.

9. A Distributed Multiple Input Multiple Output, D-MIMO, system of a Radio Access Network, RAN, the D-MIMO system comprising a Central Unit, CU, with Digital Signal Processing, DSP, for processing UpLink, UL, radio signals for channel estimation and/or for synchronizing DownLink, DL, radio signals, a first remote radio-head and a second remote radio-head for wireless communication with a wireless communications device, an analogue optical fronthaul link between the CU and the respective remote radio-head for transmitting and receiving analogue radio signals between the CU and the respective remote radio-head, wherein the CU is configured to:

receive a first UL transmission from the wireless communications device via the first and the second remote radio-head over the analogue optical fronthaul link;

receive a second UL transmission from the wireless communications device via the second remote radio-head over the analogue optical fronthaul link;

estimate a first effective UL channel for signals from the wireless communications device via the first remote radio-head based on applying DSP to the first UL transmission, wherein the first effective UL channel includes: a wireless UL channel between the wireless communications device and the first remote radio-head, at least one optical component of a first UL part of the analogue optical fronthaul link between the first remote radio-head and the CU, at least one component of a receiver chain of the first remote radio-head and at least one component of a transmitter chain of the wireless communications device;

estimate a second effective UL channel for signals from the wireless communications device to the second remote radio-head based on applying DSP to the second UL transmission, wherein the second effective UL channel includes: a wireless UL channel between the wireless communications device and the second remote radio-head, at least one optical component of a second UL part of the analogue optical fronthaul link between the second remote radio-head and the CU, at least one component of a receiver chain of the second remote radio-head and at least one component of the transmitter chain of the wireless communications device;

estimate a first calibration channel based on applying DSP to a first reference radio signal transmitted wirelessly from the first remote radio-head and received wirelessly at the second remote radio-head;

estimate a second calibration channel based on applying DSP to a second reference radio signal transmitted wirelessly from the second remote radio-head and received wirelessly at the first remote radio-head;

synchronize a first DL transmission of a first DL signal from the first remote radio-head to the wireless communications device with a second DL transmission of a second DL signal from the second remote radio-head to the wireless communications device such that at the wireless communications device a respective phase of the received first and second radio signals is phase aligned with each other, wherein the CU is configured to synchronize by being configured to a) compensate the first DL transmission of the first radio signal from the first remote radio-head to the wireless communications device based on the estimated first effective UL channel; and b) compensate the second DL transmission of the second DL radio signal from the second remote radio-head to the wireless communications device based on the estimated second effective UL channel, and further based on the estimated first calibration channel and the estimated second calibration channel; and transmit the first DL radio signal to the first remote radio-head and the second DL radio signal to the second remote radio-head over the analogue optical fronthaul link.

10. The D-MIMO system according to claim 9, wherein the first calibration channel includes a wireless calibration channel between the first remote radio-head and the second remote radio-head, at least one optical component of a first DL part of the analogue optical fronthaul link between the CU and the first remote radio-head, at least one component of a transmitter chain of the first remote radio-head, the at least one component of the receiver chain of the second remote radio-head and the at least one optical component of the second UL part of the analogue optical fronthaul link, and wherein the second calibration channel includes the wireless calibration channel between the second remote radio-head and the first remote radio-head, at least one optical component of a second DL part of the analogue optical fronthaul link between the CU and the second remote radio-head, at least a component of a transmitter chain of the second remote radio-head, the at least one component of the receiver chain of the first remote radio-head and the at least one optical component of the first UL part of the analogue optical fronthaul link.

11. The D-MIMO system according to claim 9, wherein the D-MIMO system is configured to compensate the second DL transmission of the second radio signal from the second remote radio-head by being configured to:

calculate, by the CU, a first DL calibration coefficient for the second remote radio-head based on the estimated second effective UL channel;

calculate, by the CU, a second DL calibration coefficient for the second remote radio-head based on a ratio of the estimated first calibration channel to the estimated second calibration channel; and multiply, by the CU, the second DL radio signal for transmission from the second remote radio-head to the wireless communications device with the first and second DL calibration coefficients.

12. The D-MIMO system according to claim 9, wherein compensating the first DL transmission of the first DL radio signal from the first remote radio-head and compensating the second DL transmission of the second DL radio signal from the second remote radio-head is performed in the digital domain.

13. The D-MIMO system according to claim 9, wherein the radio signals are transmitted between the CU and the respective first and second remote radio-head by modulating an optical carrier that propagates through the optical fronthaul link with the radio signals in analogue form.

14. The D-MIMO system according to claim 9, wherein the radio signals are transmitted between the CU and the respective first and second remote radio-head without using a digital interface.

15. The D-MIMO system according to claim 9, wherein the D-MIMO system is configured to estimate the UL channels and the calibration channels respectively by being configured to perform a respective measurement, by the CU, of amplitude and phase of the respective UL radio signal and reference radio signal.

16. The D-MIMO system according to claim 9, wherein the respective reference radio signal is generated from a Zadoff-Chu sequence.

17. The D-MIMO system according to claim 9, further comprising one or more further remote radio-heads, wherein the D-MIMO system is configured to perform the method for each pair of the remote radio-heads comprising the first remote radio-head.

18. The D-MIMO system according to claim 9, wherein the RAN is configured to operate based on wireless channel reciprocity.

19. The D-MIMO system according to claim 9, wherein the optical fronthaul link is at least partly fibre-based.

20. The D-MIMO system according to claim 9, wherein the optical fronthaul link is at least partly based on free space optics.

* * * * *